US008692652B2

(12) United States Patent
Takeda et al.

(10) Patent No.: US 8,692,652 B2
(45) Date of Patent: Apr. 8, 2014

(54) ANTITHEFT SYSTEM

(71) Applicant: Honda Motor Co., Ltd., Tokyo (JP)

(72) Inventors: Masato Takeda, Wako (JP); Yoshihisa Shinogi, Wako (JP); Kosei Yamashita, Wako (JP); Kenji Kuroiwa, Wako (JP); Masashi Manita, Wako (JP); Yoshinori Maekawa, Wako (JP); Makoto Yamamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/734,749

(22) Filed: Jan. 4, 2013

(65) Prior Publication Data
US 2013/0120113 A1 May 16, 2013

Related U.S. Application Data

(63) Continuation of application No. 12/499,385, filed on Jul. 8, 2009, now abandoned.

(30) Foreign Application Priority Data

Jul. 10, 2008 (JP) ................................ 2008-180557
Jul. 10, 2008 (JP) ................................ 2008-180558

(51) Int. Cl.
G05B 23/00 (2006.01)
G06F 7/00 (2006.01)
G05B 19/00 (2006.01)
H04Q 9/00 (2006.01)

(52) U.S. Cl.
USPC ............ 340/5.8; 340/5.25; 340/5.31; 340/5.6

(58) Field of Classification Search
USPC ........................................ 340/5.25, 5.31, 5.72
See application file for complete search history.

(56) References Cited

U.S. PATENT DOCUMENTS

| 5,734,330 | A   | * | 3/1998 | Nakamura | .................... 340/5.22 |
| 6,160,488 | A   | * | 12/2000 | Honda | ......................... 340/5.65 |
| 6,310,542 | B1  |   | 10/2001 | Gehlot | |
| 6,501,369 | B1  | * | 12/2002 | Treharne | ...................... 340/5.22 |
| 6,525,433 | B1  | * | 2/2003 | Enoyoshi et al. | ............ 307/10.5 |
| 6,531,955 | B1  | * | 3/2003 | Brendzel et al. | ............. 340/5.31 |
| 6,963,794 | B2  | * | 11/2005 | Geber et al. | ...................... 701/2 |
| 7,042,333 | B2  | * | 5/2006 | Dix et al. | ...................... 340/5.72 |

(Continued)

FOREIGN PATENT DOCUMENTS

| DE | 102005030081 A1 | 1/2007 |
| DE | 102006018831 A1 | 10/2007 |

(Continued)

*Primary Examiner* — Daniel Wu
*Assistant Examiner* — Mohamed Barakat
(74) *Attorney, Agent, or Firm* — Arent Fox LLP

(57) ABSTRACT

In an antitheft system for preventing an equipment comprising moving objects such as electric vehicles or operating machine such as lawnmower from theft, an electronic key is prepared to be carried by an operator of the equipment and stores authenticating data for identifying the operator who carries the electronic key. An authenticator is installed at the equipment and performs authentication check as to whether the electronic key is an authorized key using stored key-checking data, when the authenticating data is outputted from the electronic key, whereas an electronic key copier is provided separately from the equipment and copies the electronic key, thereby enabling to make a copy of the electronic key without activating equipment, while ensuring to prevent the equipment from theft.

11 Claims, 17 Drawing Sheets

(56) References Cited

U.S. PATENT DOCUMENTS

| | | | |
|---|---|---|---|
| 7,068,144 B2* | 6/2006 | Gilbert et al. | 340/5.22 |
| 7,222,006 B2* | 5/2007 | Proefke et al. | 701/29.6 |
| 7,280,034 B2* | 10/2007 | Matsumoto et al. | 340/426.35 |
| 7,933,412 B2* | 4/2011 | Kugumiya et al. | 380/258 |
| 2002/0180582 A1 | 12/2002 | Nielsen | |
| 2005/0099265 A1* | 5/2005 | Dix et al. | 340/5.72 |
| 2006/0131959 A1* | 6/2006 | Nishijima et al. | 307/10.5 |
| 2006/0220806 A1* | 10/2006 | Nguyen | 340/426.36 |
| 2009/0306849 A1* | 12/2009 | Blanz et al. | 701/33 |
| 2009/0309696 A1* | 12/2009 | Tsuruta et al. | 340/5.22 |

FOREIGN PATENT DOCUMENTS

| | | |
|---|---|---|
| DE | 102006018831 A1 * | 10/2007 |
| EP | 1484463 A1 | 12/2004 |
| JP | 10-016714 A | 1/1998 |
| JP | 2001-043431 A | 2/2001 |
| JP | 2004-098929 A | 4/2004 |
| JP | 2004-232277 A | 8/2004 |
| JP | 2006-127307 A | 5/2006 |
| JP | 2007-112363 A | 5/2007 |
| JP | 2007-244207 A | 9/2007 |
| JP | 2007-309015 A | 11/2007 |

* cited by examiner

```
                                                    134d
1. USER ID
2. PRODUCT ID
SERVICE DATA
3. TOTAL OPERATION DURATION TA:TOTAL USE TIME
OF EQUIPMENT
    ·IDLE OPERATION TIME T1
    ·WIDE-OPEN OPERATION TIME T2
    ·PARTIALLY OPEN OPERATION TIME T3
4. NUMBER OF OPERATING TIMES(CNT):NUMBER OF
OPERATION OF EQUIPMENT
5. OPERATION PARAMETERS
6. ERROR CODE
7. ABNORMAL-STATE OPERATION PARAMETERS
```

ANTITHEFT SYSTEM

CROSS-REFERENCE TO RELATED APPLICATIONS

This application is a continuation of U.S. application Ser. No. 12/499,385, filed Jul. 8, 2009, which claims priority to Japanese Patent Application Nos. JP 2008-180557 and JP 2008-180558, both of which were filed Jul. 10, 2008. The disclosures of the prior applications are hereby incorporated in their entirety by reference.

BACKGROUND OF THE INVENTION

1. Field of the Invention

This invention relates to an antitheft system, particularly to a system for preventing equipment such as a moving object or operating machine from theft.

2. Description of the Related

In recent years, for equipment such as a moving object(s) (specifically a small electric car(s), automobile(s) or the like) to be shared by multiple operators (users), various systems have been developed that prevent theft of the equipment, as taught by, for example, Japanese Laid-Open Patent Application No. 2001-43431 (particularly in paragraphs 0064 to 0069, FIG. 7, etc.). The reference is configured such that, when the operator inserts an electronic key that stores operator-specific authenticating data (ID) into an authentication device (reading mechanism) that is installed in the equipment and stores key-checking data for verification, and when the authenticating data outputted from the key and the key-checking data are not identical, the system does not allow use of the equipment.

SUMMARY OF THE INVENTION

When the equipment is shared by multiple users as mentioned above, it is preferable for convenience that each user has his/her own electronic key, and accordingly the same number of copies of the key as the users should be made. In that case, the operator will usually copy the key by using the authentication device installed in the equipment. For that purpose, the operator will store the key-checking data corresponding to the key to be copied and must activate the equipment every time the key is to be copied. This is troublesome and tedious.

An object of this invention is therefore to overcome the aforesaid problem by providing an antitheft system that can make a copy of an electronic key without activating equipment such as a moving object or operating machine, while ensuring to prevent the equipment from theft.

In order to achieve the object, this invention provides a system for preventing an equipment from theft, comprising: an electronic key that is adapted to be carried by an operator of the equipment and stores authenticating data for identifying the operator who carries the electronic key; an authenticator that is installed at the equipment and performs authentication check as to whether the electronic key is an authorized key using stored key-checking data, when the authenticating data is outputted from the electronic key; and an electronic key copier that is provided separately from the equipment and copies the electronic key.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

An antitheft system according to embodiments of the invention will now be explained with reference to the attached drawings.

Figure 1:
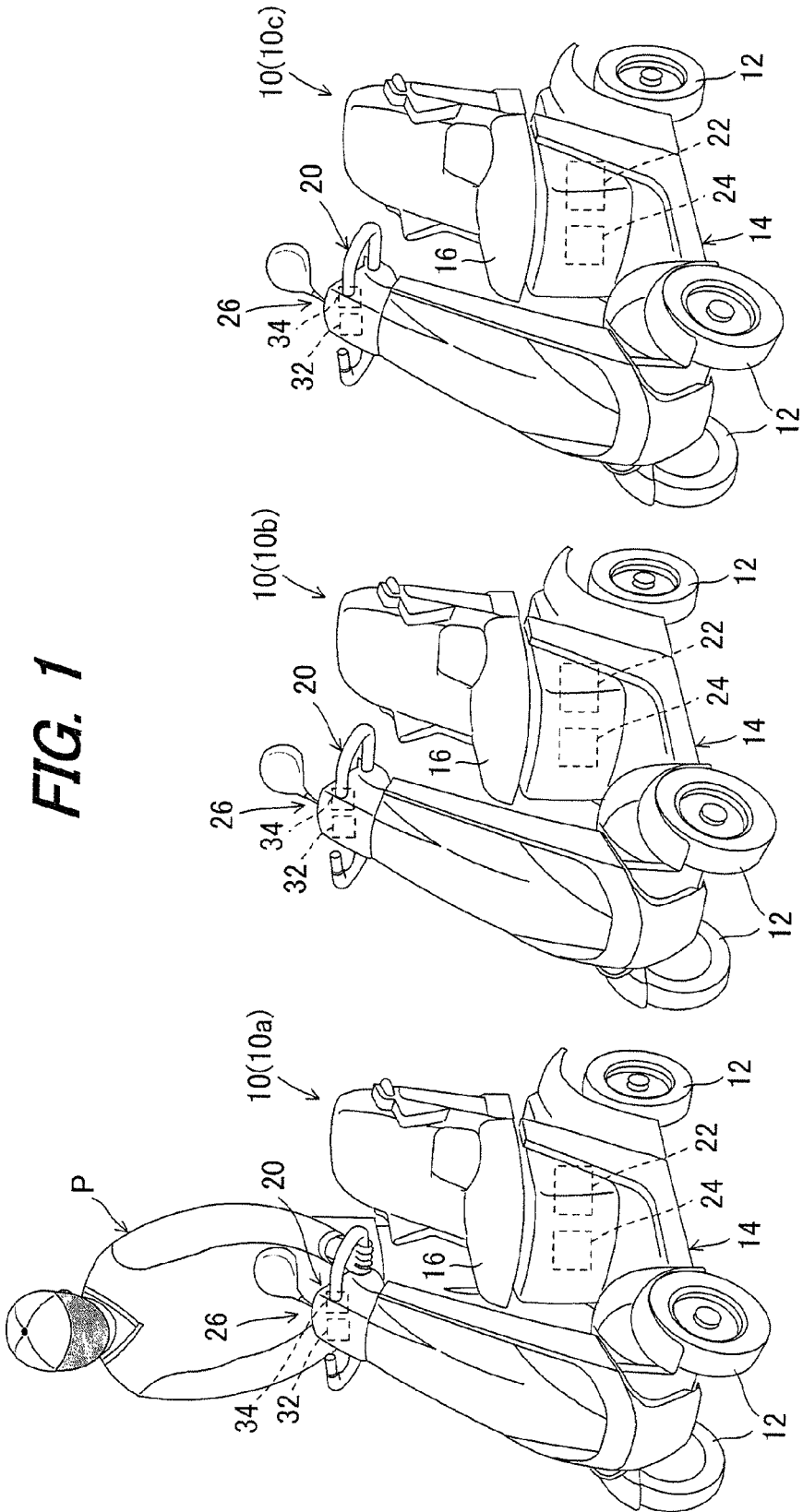
FIG. 1 is a perspective view of a small electric vehicle on which a part of an antitheft system according to a first embodiment of this invention is mounted.

FIG. 1 is a perspective view of a small electric vehicle on which a part of an antitheft system according to a first embodiment of this invention is mounted.

In FIG. 1, reference numeral 10 generally indicates the small electric vehicles (equipment). As illustrated, a plurality of (e.g., three) vehicles 10 are indicated by reference numerals 10a, 10b, 10c. Although the vehicles 10 will be explained taking the vehicle 10a as an example, since the other vehicles 10b, 10c have the substantially same configuration, the following explanation can also be applied thereto.

The vehicle 10 is a relatively small, single-passenger, electric vehicle, precisely an electric wheelchair or electric four-wheel scooter equipped with a body frame 14 supported by four wheels 12 (one of which is not shown in FIG. 1), a seat 16 installed on the frame 14 to be taken by the operator (user) P, and an operation unit 20 to be manually operated by the operator P. The vehicle 10 is a moving object that moves at extremely low speed, i.e., at a human walking speed, and is suitable for the elderly.

An electric motor 22 for driving the wheels 12 (specifically rear wheels) and a battery (i.e., a lead battery) 24 for supplying operating power to the motor 22 and the like are installed under the seat 16. The motor 22 is a brushless motor.

Figure 2:
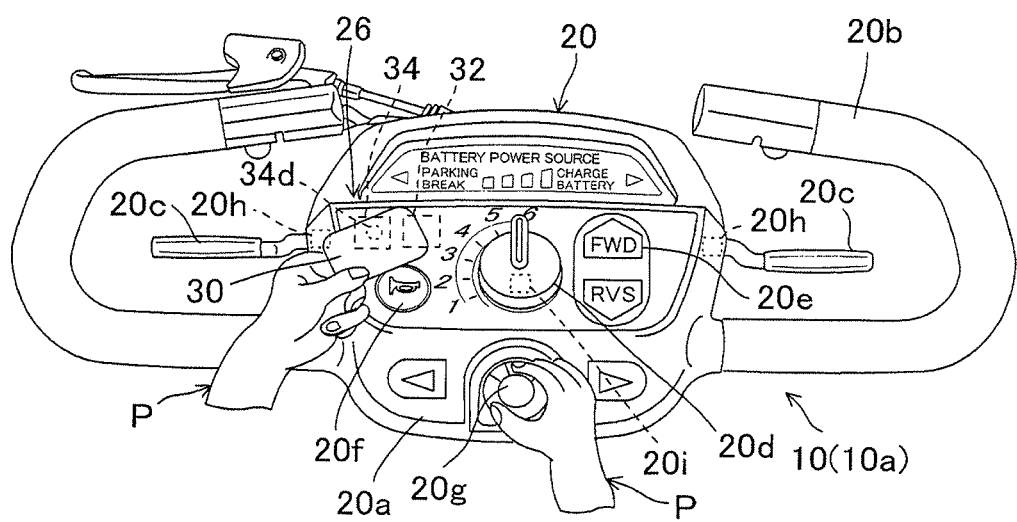
FIG. 2 is a front view of a control panel of the vehicle shown in FIG. 1.

FIG. 2 is a front view of the operation unit 20 of the vehicle 10 shown in FIG. 1.

As shown in FIG. 2, the operation unit 20 comprises a loop-shaped handle 20b laterally projecting, as curving, from a dashboard 20a, two drive levers 20c that laterally projects and allows the operator P to input a moving/stopping instruction, a speed setting knob 20d that allows the operator P to set a desired travel speed within a range starting continuously from 1 km/h up to 6 km/h, forward/reverse switches 20e that allows the operator P to input a traveling direction instruction between forward and reverse travels, a horn switch 20f that allows the operator P to sound a horn (not shown), a power switch key 20g that allows the operator P to connects/disconnects power from the battery 24 to the motor 22, and other components.

Two drive switches 20h are installed near the drive levers 20c. The drive switch 20h produces an ON signal when one of the drive levers 20c is manipulated by the operator P to drive and an OFF signal when manipulated by the operator P to stop. A speed setting knob sensor 20i is installed near the knob 20d and produces an output or signal (speed instruction) corresponding to the desired travel speed set by the operator P through the speed setting knob 20d.

Details of the vehicle 10 are described in Japanese Laid-Open Patent Application No. 2007-112363 proposed by the applicant earlier and the further explanation is omitted here.

Figure 3:
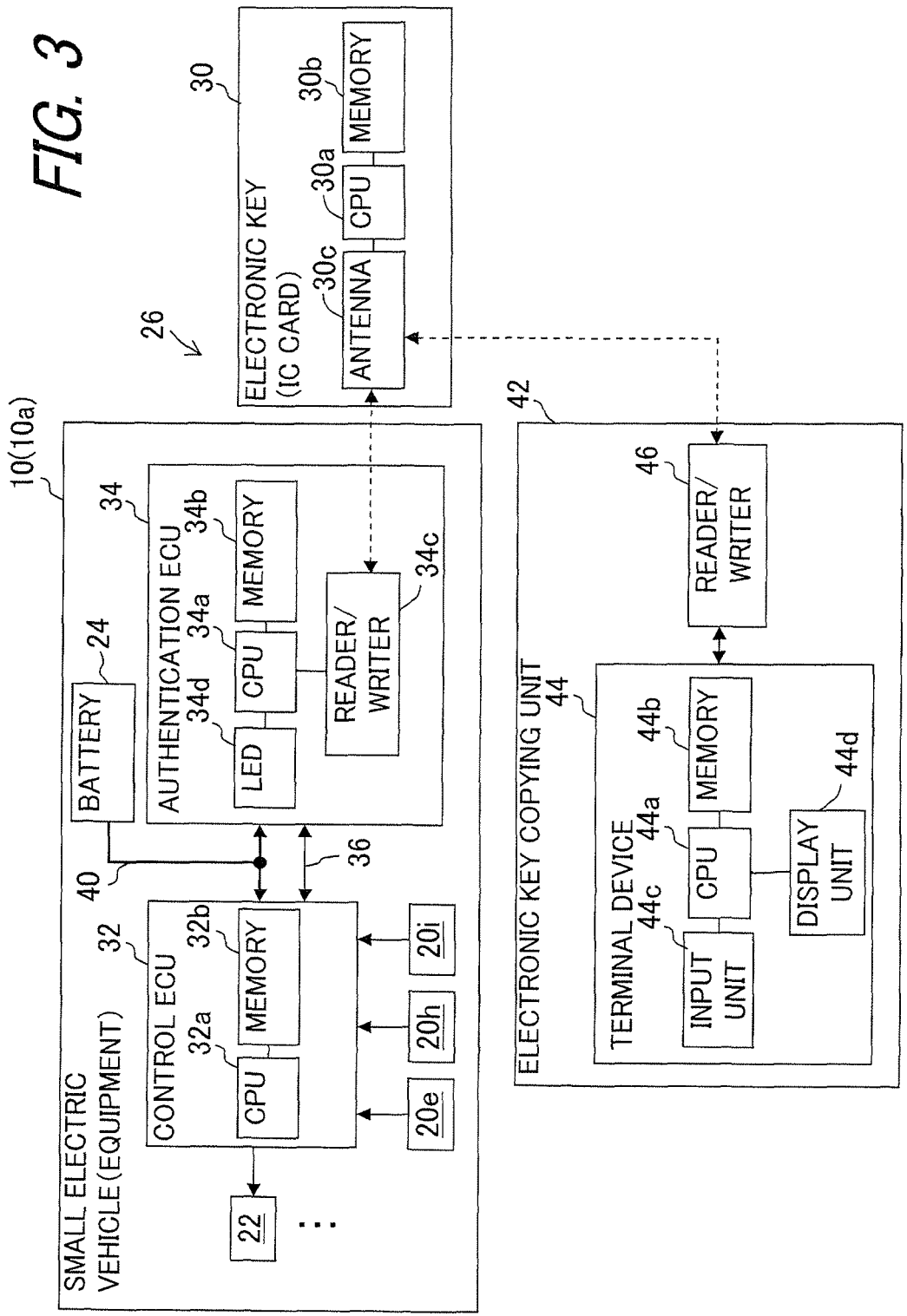
FIG. 3 is a block diagram showing the configuration of the system for the vehicle shown in FIG. 1.

FIG. 3 is a block diagram showing the configuration of the antitheft system for the vehicles 10.

In FIG. 3, reference numeral 26 designates the antitheft system. The system 26 comprises an electronic key 30 that stores authenticating data (ID; explained later), a control ECU (electronic control unit) 32 installed in each vehicle 10 for controlling the operation of the motor 22 and the like, and an authentication ECU (electronic control unit; authenticator) 34 installed in each vehicle 10 for authenticating the key 30. The ECUs 32, 34 are disposed at an appropriate location in each vehicle 10, specifically near the power switch key 20g in the interior of the dashboard 20a of the operation unit 20, as clearly shown in FIG. 2.

The control ECU 32 comprises a microcomputer having a CPU 32a, memory (EEPROM non-volatile memory) 32b and other components. The control ECU 32 is inputted by the operator P with a traveling direction instruction through the forward/reverse switch 20e, a drive instruction through the drive switch 20h, and a speed instruction through the speed setting knob sensor 20i. The control ECU 32 controls the operation of the motor 22 and the like in response to those instructions, thereby controlling the operation of the vehicle 10.

Specifically, the operator P selects a traveling direction using the forward/reverse switch 20e and sets desired travel speed using the speed setting knob 20d. Then, when the operator P grips or grasps one of (or both of) the drive levers 20c with the handle 20b, the vehicle 10 starts moving at the set speed, and when the operator P releases it, the vehicle 10 stops.

The authentication ECU 34, similarly to the control ECU 32, comprises a microcomputer having a CPU 34a, memory (EEPROM (non-volatile memory)) 34b for storing key-checking data (explained later), and other components. The authentication ECU 34 further comprises a reader/writer 34c for reading authenticating data stored in the key 30, and an LED (light-emitting diode (signal lamp)) 34d installed on the dashboard 20a for informing the operator P of the result of electronic key authentication (pass/fail) which will be explained later.

The so-configured authentication ECU 34 is connected for communication with the control ECU 32 through a serial communication line 36. The ECUs 32, 34 are connected to the battery 24 through a power line 40 to be supplied with operating power from the battery 24.

The key 30 is a contact-less IC (integrated circuit) card equipped with a CPU 30a, a non-volatile memory 30b for storing authenticating data (i.e., identification data (user ID) for identifying the operator P who carries the key 30 and identification information (product ID) for identifying the model, product number, etc., of the vehicles 10), and an antenna 30c for exchange (input/output) with the reader/writer 34c of authenticating data and the like by short-distance wireless communication (RFID: Radio Frequency Identification). The IC card constituting the key 30 is a card made of resin and houses the CPU 30a and other components in its interior. As shown in FIG. 2, it is made portable to be carried by the operator P.

There now follows an explanation of the certification process that is one aspect of the communication activity between the key 30 and reader/writer 34c of the authentication ECU 34. When the operator P moves the key 30 to the reader/writer 34c after the ECU 34 has been supplied with operating power from the battery 24, the reader/writer 34c outputs (transmits) radio wave to the key 30.

Upon receipt of the radio wave transmitted by the reader/writer 34c, the key 30 generates power by electromagnetic induction of a built-in coil (not shown), thereby activating the CPU 30a and the like. In other words, the key 30 is not equipped with a battery or other internal power supply source but is supplied with operating power induced by the radio wave from the reader/writer 34c.

Upon being supplied with power, the CPU 30a of the key 30 outputs the authenticating data stored in the memory 30b to the reader/writer 34c through antenna 30c. When the authenticating data is outputted from the key 30, the authentication ECU 34 uses the key-checking data stored in the memory 34b to perform an authentication check to determine whether the key 30 is an authorized key. The key-checking data is identical to the authenticating data and is the unique data (user ID and product ID) set for each vehicle 10a, 10b, 10c.

The ECU 34 performs the authentication by comparing the authenticating data in the key 30 with the key-checking data. Specifically, the authenticating data and the key-checking data are compared each other to determine whether they are identical, and the key 30 moved to the reader/writer 34c is discriminated to be an authorized key for the vehicle 10 if they are the same and not to be an authorized key if they do not match.

The key 30 is thus a contact-less (wireless) IC card that can input/output (communicate) authenticating data and the like when the operator P merely moves it to, but out of contact with, the reader/writer 34c of the authentication ECU 34.

Since the foregoing configuration enables transmission/reception of authenticating data and the like between the key 30 comprising a contact-less IC card and the reader/writer 34c, it is possible to avoid inconveniences that might arise in the case of transmission/reception using a wired communication means to connect an electronic key with an authentication ECU, specifically problems such as that of data communication becoming impossible owing to breaking of communication cable.

The explanation of the system 26 will be continued. The system 26 comprises, in addition to the authentication ECU 34, etc., an electronic key copying unit (electronic key copier) 42 for copying the key 30.

The copying unit 42 is solely provided for a plurality of (three) vehicles 10a, 10b, 10c, separately or independently therefrom. The copying unit 42 is equipped with a terminal device 44 for making a copy and a reader/writer 46 connected to the device 44. The device 44 is a personal computer having a CPU 44a, a memory 44b, an input unit 44c including a keyboard, mouse and the like (none of which is shown) operable by the operator P, and a display unit 44d including a display (screen). The device 44 is connected to a power source (e.g., a commercial power source; not shown) that supplies operating power.

The reader/writer 46 operates similarly to the reader/writer 36c of the authentication ECU 34. Specifically, when the key 30 is moved near, the reader/writer 46 outputs a radio wave to the key 30, thereby supplying operating power to the key 30, reads authenticating data from the key 30, and writes new authenticating data (explained later) into the key 30.

The operation of the system 26 thus configured will be explained.

Figure 4:
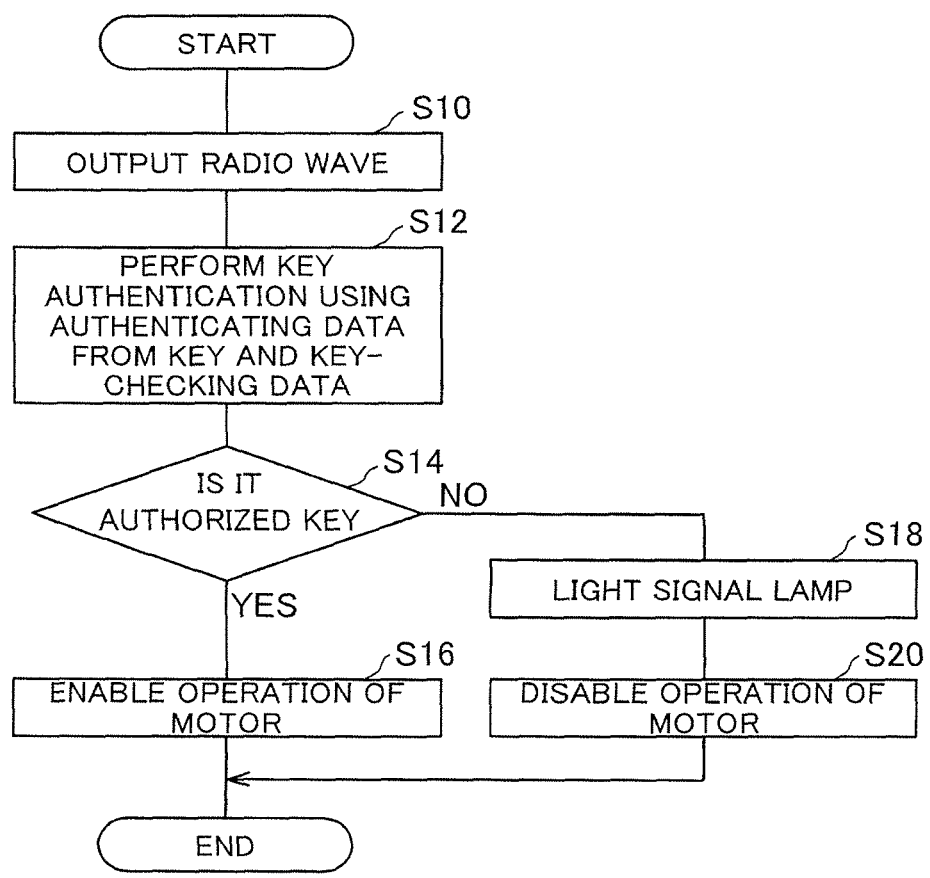
FIG. 4 is a flowchart showing the operation of the system, specifically the sequence of operations of an authentication ECU thereof.

FIG. 4 is a flowchart showing the operation of the system 26, specifically the sequence of operations of the authentication ECU 34 thereof. The illustrated program is executed only once when the associated vehicle 10 is started.

When the operator P operates the power switch key 20g, precisely, turns on the switch key 20g while moving the key 30 to the reader/writer 34c as shown in FIG. 2, the battery 24 commences supplying the authentication ECU 34 with operating power.

After the ECU 34 is activated with the power supply, the program begins in S10, in which the reader/writer 34c outputs radio wave to the key 30 to supply operating power.

The program next proceeds to S12, in which the authentication of the key 30 is performed using the authenticating data outputted from the key 30 and key-checking data.

The program then proceeds to S14, in which it is determined whether the key 30 was found to be an authorized key for the vehicle 10. When the result is affirmative, the program proceeds to S16, in which a signal enabling the operation of the motor 22 is sent to the control ECU 32, whereafter the program is terminated. With this, the control ECU 32 starts controlling the operation of the motor 22 in accordance with the instructions inputted via the running switch 20h, etc., whereby the vehicle 10 is operated normally.

When the result in S14 is negative, the program proceeds to S18, in which the signal lamp 34d is lit to inform the operator P that the key 30 was found to be not the authorized key, and to S20, in which a signal disabling the operation of the motor 22 is sent to the control ECU 32. In response thereto, the ECU 32 stops the operation of the motor 22, thereby stopping the operation of the associated vehicle 10, regardless of instructions inputted from the running switch 20h and the like. Thus the system 26 prevents the vehicle 10 from theft.

When the vehicles 10a, 10b, 10c are to be shared by multiple operators P, it is convenient for each operator P to have his/her own key 30, and accordingly the same number of copies of the key 30 as the operators P should be made. If each copy of the key 30 can activate all of the vehicles 10a, 10b, 10c, it further enhances convenience.

The operation of copying the key 30 conducted by the copying unit 42 of the system 26 will be explained.

Figure 5:
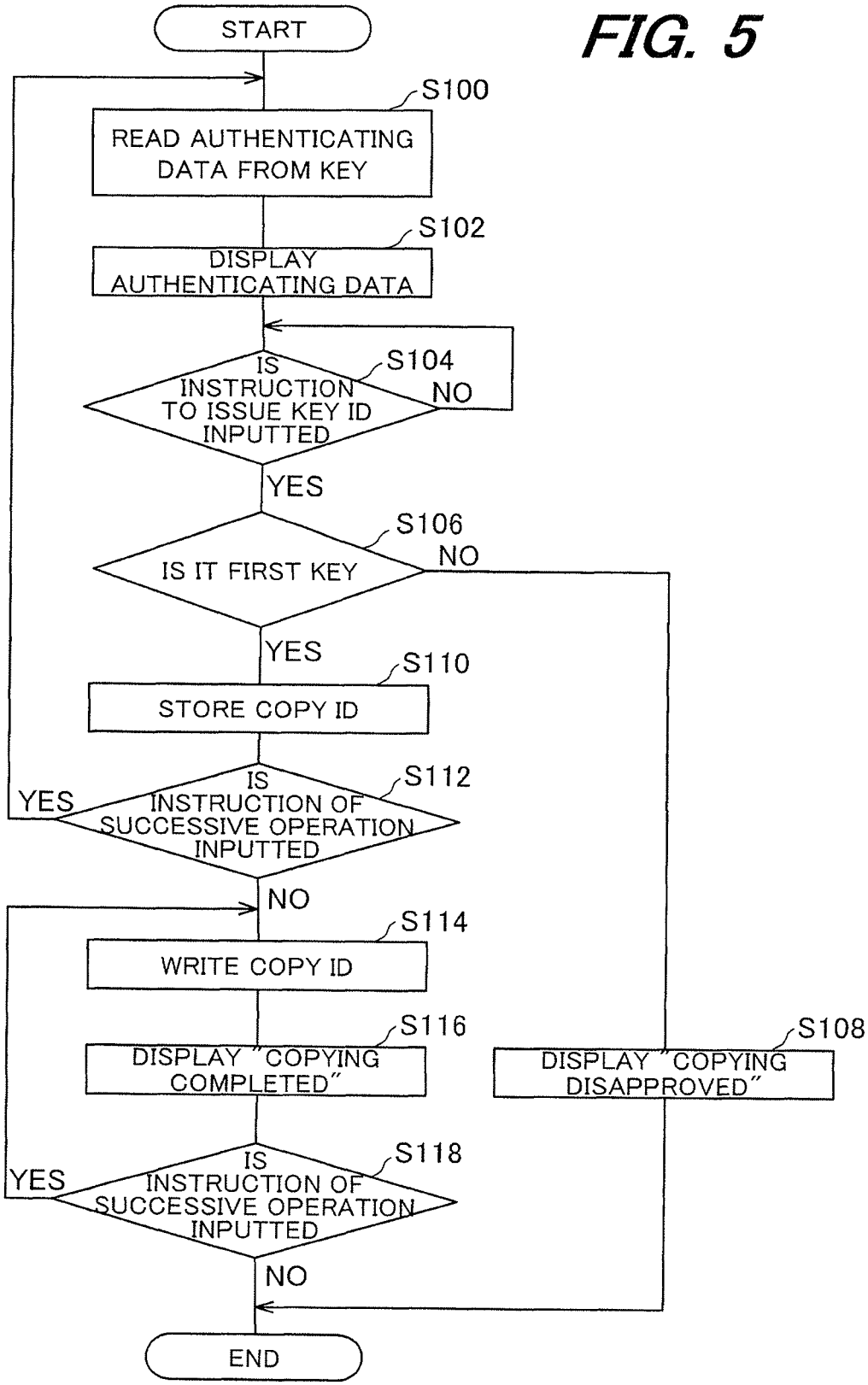
FIG. 5 is a flowchart showing the operation of copying an electronic key among the operations of the system.

FIG. 5 is a flowchart showing the operation of copying the key 30. The illustrated operation is conducted in the terminal device 44 when the key 30 is moved to the reader/writer 46 of the copying unit 42.

Before explaining the flowchart of FIG. 5, the explanation on the key 30 is made in detail. As described, the authenticating data (ID) is stored in the memory 30b of the key 30. The key 30 falls into two types, i.e., a first electronic key (master key) 301 and a second electronic key (duplicate key) 302, depending on a kind of the stored authenticating data.

Figure 6:
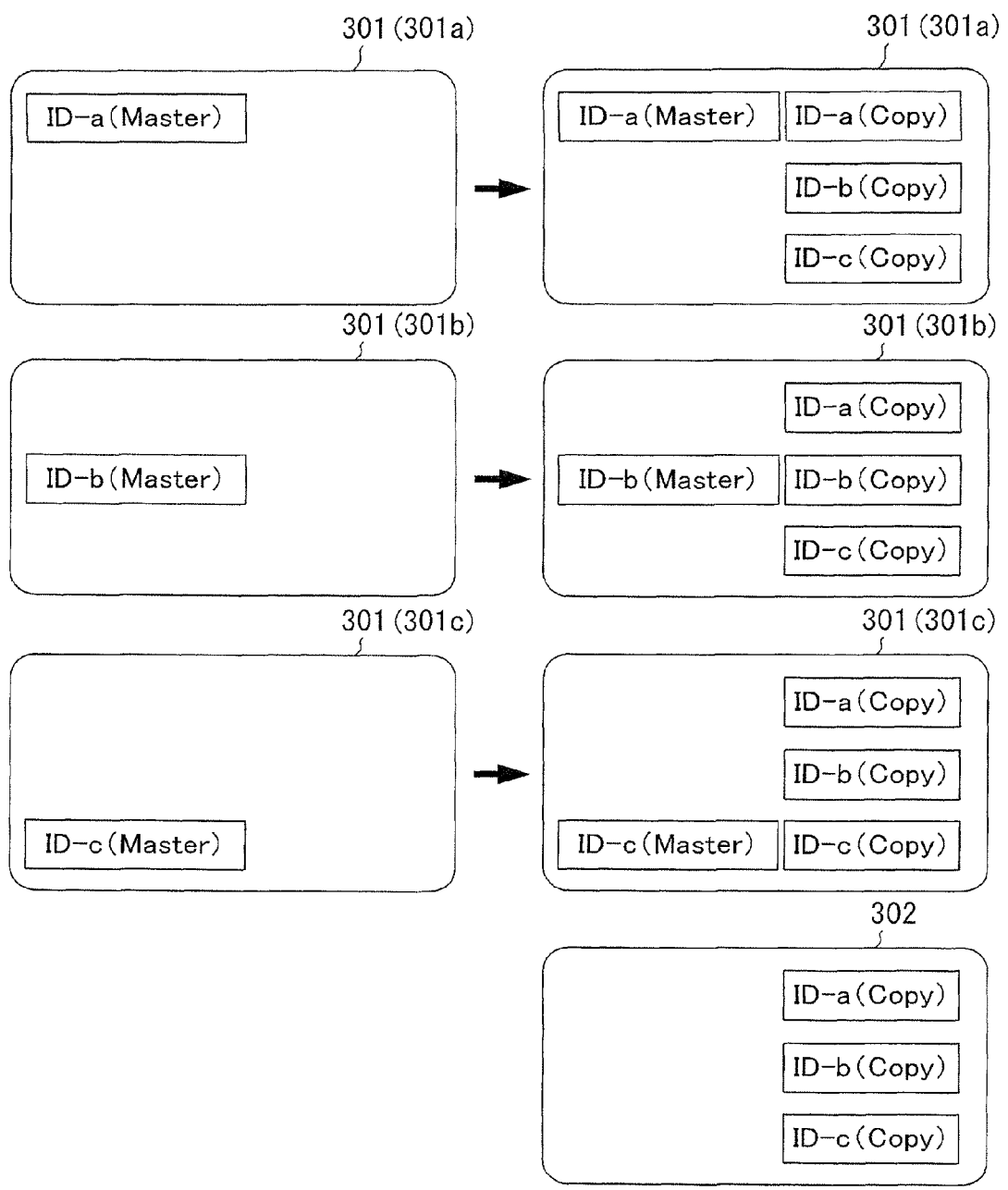
FIG. 6 is an explanatory view schematically showing authenticating data stored in the keys shown in FIG. 3.

FIG. 6 is an explanatory view schematically showing the authenticating data stored in the first and second keys 301, 302. In FIG. 6, the first keys 301 before copying are shown on the left side in the drawing and the first and second keys 301, 302 after copying on the right side.

As shown, a plurality of (i.e., three, more exactly the same number as the vehicles 10) the first keys 301 are designated by reference numerals 301a, 301b, 301c. The first keys 301a, 301b, 301c (before copying) each stores the authenticating data (ID) corresponding to the associated vehicle 10a, 10b, 10c. In FIG. 6, the authenticating data corresponding to (i.e., capable to activate) the vehicle 10a is indicated by ID-a. Similarly, the authenticating data corresponding to the vehicles 10b, 10c are indicated by ID-b, ID-c, respectively.

The authenticating data (ID) in the first key 301 is an ID with which the copying unit 42 can make a duplicate key and hereinafter called the master ID (indicated as "(Master)" in FIG. 6). Thus the first key 301 is a key that can be copied by the copying unit 42.

On the other hand, the second key 302 is a duplicate key of the first key 301 made by the copying unit 42 and does not store the authenticating data (ID) constituted of the master ID. Thus the key 30 falls into two types of the first key 301 and the second key 302 depending on a kind of the stored authenticating data, i.e., on whether the authenticating data is the master ID. In FIG. 6, the authenticating data with a term of "copy" in parentheses indicates a copy of the master ID made by the copying unit 42 and hereinafter called the "copy ID."

Returning to FIG. 5, when the operator P moves the key 30 to the reader/writer 46, the key 30 is supplied with operating power induced by the radio wave and outputs the authenticating data.

Then the program starts in S100, in which the outputted authenticating data is read and the program proceeds to S102, in which the read authenticating data is displayed on the display unit 44d.

The program proceeds to S104, in which it is determined whether an instruction to issue a key ID is inputted by the operator P. The key ID is an ID (number) assigned to the key 30. Specifically, the processing of S104 is conducted for determining whether the operator P has inputted an ID (e.g., ID-a) to be assigned to the key 30 using the input unit 44c (i.e., has instructed to issue the ID), in other words, for checking as to whether the operator P desires to copy the key 30.

When the result in S104 is negative, the processing of S104 is repeated until the operator P inputs the instruction to issue the key ID, and when the result is affirmative, the program proceeds to S106, in which it is determined whether the key 30 near the reader/writer 46 is the first key 301.

When the result in S106 is negative, i.e., when the key 30 is the second key 302 or another electronic key, the program proceeds to S108, in which an indication of "copying disapproved" appears on the display unit 44d to inform the operator P that a copy of the key 30 cannot be made and the routine ends. Thus the copying unit 42 is configured to enable copying of the key 30 only from the first key 301, i.e., disable copying from the second key 302.

When the result in S106 is affirmative, the program proceeds to S110, in which the authenticating data (ID) read in S100 is copied and stored in the memory 44b as the copy ID. Then the program proceeds to S112, in which it is determined whether an instruction to successively perform the processing of storing a copy of the authenticating data by using another first key 301 is inputted, and when the result is affirmative, the program returns to S100 and the foregoing processing is repeated.

The processing of S112 is further explained.

When, in S110, for example, a copy of the authenticating data (copy ID; ID-a (Copy)) of the first key 301a is stored, the operation to store copies of the authenticating data (ID-b (Copy), ID-c (Copy)) of the first keys 301b, 301c needs to be successively conducted.

Therefore, the operator P inputs a continuation instruction after a copy of the authenticating data (ID-a (Copy)) of the first key 301a is stored, while the first key 301b (or the first key 301c) is moved to the reader/writer 46. Specifically, the processing from S100 to S112 is repeated three times and accordingly, the three authenticating data (ID-a (Copy), ID-b (Copy), ID-c (Copy)) are stored in the memory 44b.

When the result in S112 is negative because the above operation of storing the copy ID is completed, the program proceeds to S114, in which the three copy IDs stored in the step of S110 are written into a new electronic key, which is to be the second key 302. At this time, the new key to be the second key 302 is moved to the reader/writer 46 by the operator P.

The program next proceeds to S116, in which an indication of "copying completed" is displayed on the display unit 44d to inform the operator P of completion of the second key 302. Thus the second key 302 shown in FIG. 6, i.e., the second key 302 having only copies of the three authenticating data (copy IDs), is made.

The program then proceeds to S118, in which it is determined whether the operator P inputs an instruction to produce another second key 302 successively. When the result is negative, the program is terminated, while, when the result is affirmative, the processing of S114 and S116 is repeated to make another second key 302.

After making a duplicate key, i.e., the second key 302, from the first keys 301a, 301b, 301c as in the foregoing, copies of the three authenticating data (copy IDs which are the same as those in the second key 302) are written into the first keys 301. Specifically, the three authenticating data are stored in the first key 301, thereby enabling the first key 301 to operate or activate all the vehicles 10a, 10b, 10c.

Figure 7:
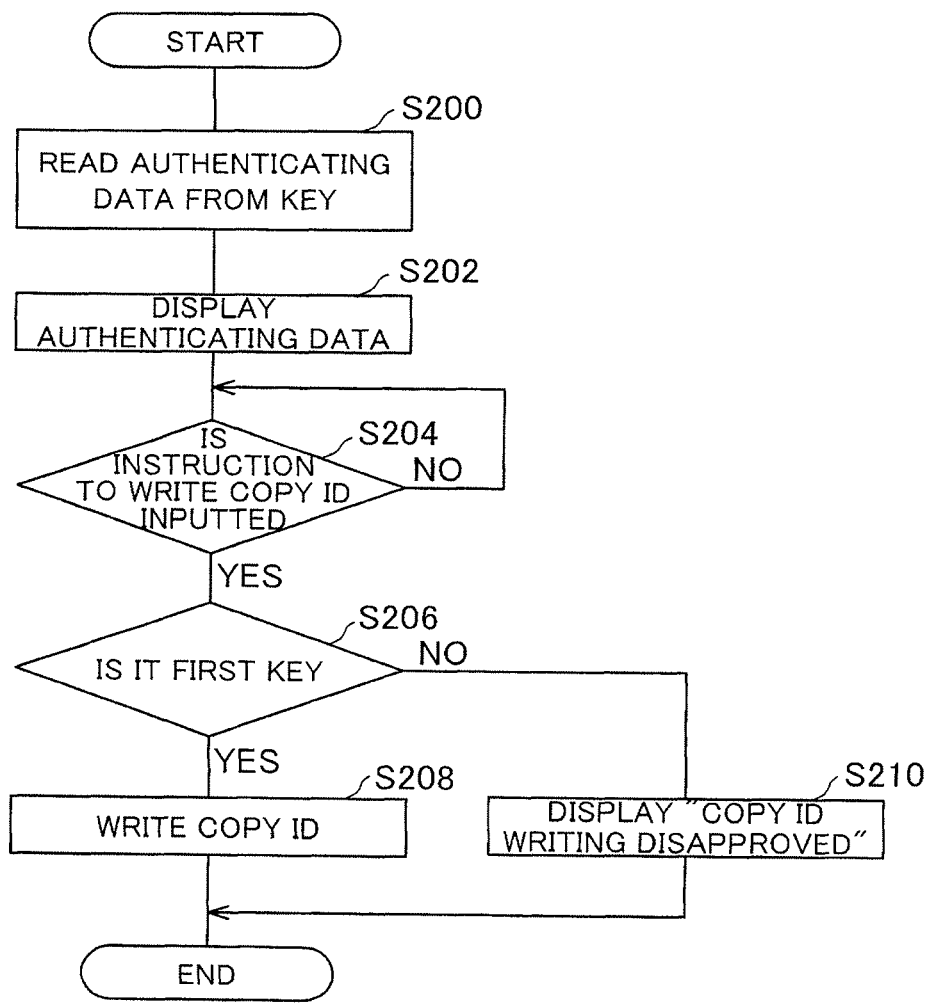
FIG. 7 is a flowchart showing the operation of writing into a first key among the operations of the system.

FIG. 7 is a flowchart showing the operation of writing into the first key 301. The illustrated operation is conducted in the terminal device 44 when the key 30 is moved to the reader/writer 46 after the routine of FIG. 5 ended.

When the operator P moves the key 30 to the reader/writer 46, the key 30 is supplied with operating power induced by the radio wave and outputs the authenticating data.

The program starts at S200, in which the outputted authenticating data is read and proceeds to S202, in which the read authenticating data is displayed on the display unit 44d.

The program next proceeds to S204, in which it is determined whether an instruction to write the copied authenticating data (copy ID) is inputted by the operator P. When the result is negative, the processing of S204 is repeated until the operator P inputs the writing instruction, and when the result is affirmative, the program proceeds to S206, in which it is determined whether the key 30 near the reader/writer 46 is the first key 301.

When the result in S206 is affirmative, the program proceeds to S208, in which the three authenticating data (copy IDs, i.e., ID-a (Copy), ID-b (Copy), ID-c (Copy)) stored in the memory 44b are written into the first key 301. As a result, the first key 301 shown on the right side in FIG. 6, i.e., the first key 301 storing the one master ID and three copy IDs, is made.

On the other hand, when the result in S206 is negative, the program proceeds to S210, in which an indication of "copy ID writing disapproved" is displayed on the display unit 44d to inform the operator P that writing of the copy ID is not conducted and the routine ends. Thus the copying unit 42 is configured to be disabled to write the copy ID into an electronic key other than the first key 301, after making the second key 302.

Since the three copy IDs are thus written into (stored in) both of the first and second keys 301, 302, the authentication ECU 34 can authenticate the keys 301, 302 as the authorized keys at the next starting of the vehicle 10.

Figure 8:
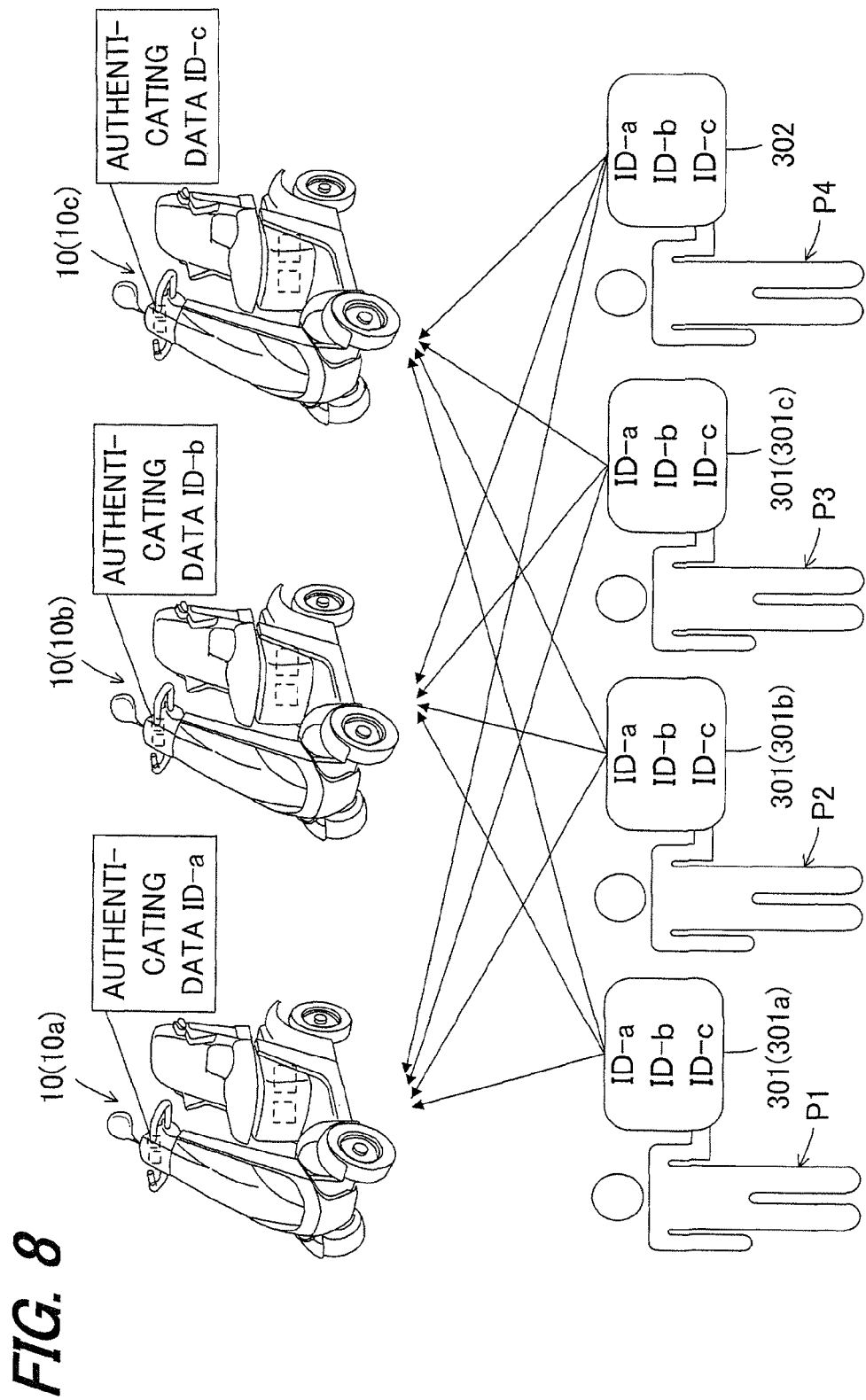
FIG. 8 is an explanatory view showing the relationship between the key and vehicle shown in FIG. 3.

This will be explained with reference to FIG. 8. Due to the foregoing copying operation, each of the first and second keys 301, 302 can store a plurality of (three) authenticating data (ID-a (Copy), ID-b (Copy), ID-c (Copy)) corresponding to the vehicles 10a, 10b, 10c. Therefore, each of the multiple operators P1, P2, P3, P4 can own the key 30, i.e., the first keys 301a, 301b, 301c or the second key 302, and operate or activate all of the vehicles 10a, 10b, 10c by the key 30.

Figure 9:
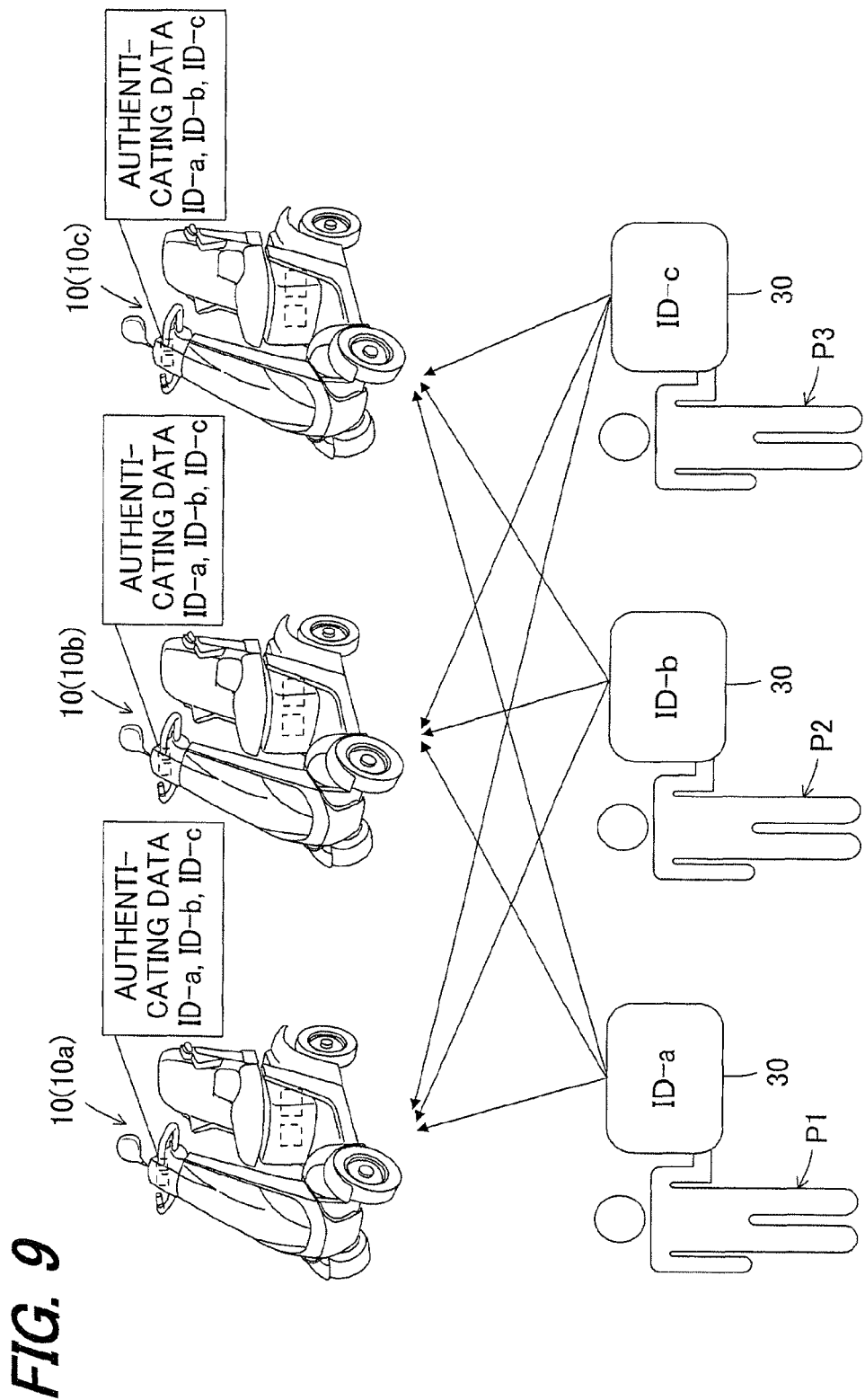
FIG. 9 is an explanatory view similar to FIG. 8, but showing the relationship between an electronic key and a small electric vehicle according to a prior art.

On the other hand, in the prior art, as shown in FIG. 9, each duplicate key 30 stores different authenticating data (ID-a, ID-b or ID-c). The authentication ECU 34 of the vehicle 10 stores key-checking data corresponding to the respective duplicate keys 30 and hence, the vehicles 10 have to be activated one by one to rewrite the key-checking data.

In contrast, since the system 26 according to the first embodiment is provided with the copying unit 42 separately from the associated vehicle 10, it becomes possible to make a copy of the key 30 without activating the associated vehicle 10. Further, since the key 30 stores the three authenticating data (ID-a, ID-b, ID-c), it becomes possible to activate all of the vehicles 10a, 10b, 10c by the single key 30.

As stated above, the first embodiment is configured to have a system (26) for preventing an equipment (small electric vehicle 10) from theft, comprising: an electronic key (30) that is adapted to be carried by an operator of the equipment and stores authenticating data for identifying the operator who carries the electronic key; an authenticator (authentication ECU 34, S12, S14) that is installed at the equipment and performs authentication check as to whether the electronic key is an authorized key using stored key-checking data, when the authenticating data is outputted from the electronic key; and an electronic key copier (copying unit 42, S100-S118, S200-S210) that is provided separately from the equipment and copies the electronic key.

With this, since the copying unit 42 is provided separately from or independently of the associated vehicle 10, it becomes possible to make a copy of the key 30 without activating the associated vehicle 10, and by providing the key 30 and the authentication ECU 34, it becomes possible to prevent the equipment from theft.

In the system, the electronic key (30) comprises at least one of a first electronic key (301) and a second electronic key (302) copied from the first electronic key by the electronic key copier, and the electronic key copier inhibits additional copying of the second electronic key (S106, S108). With this, it becomes possible to restrict copying of the key 30, i.e., prevent an undesired copy of the key 30 from being made, thereby rendering the management of the key 30 easier.

In the system, the equipment comprises a plurality of moving objects (small electric vehicles 10*a*, 10*b*, 10*c*) and the electronic key stores authenticating data in a same number as that of the equipment. With this, it becomes possible to activate a plurality of the vehicles (equipment) 10 with the single key 30 and hence, the operator P does not need to have multiple keys for operating the multiple vehicles 10, thereby enhancing convenience.

In the system, the electronic key copier (copying unit 42) comprises a terminal device (44), and a reader/writer (46) that is connected to the terminal device and reads the authenticating data outputted from the electronic key (30) and writes the authenticating data to the electronic key. With this, it becomes possible to make a copy of the key 30 with the simple structure.

In the system, the equipment comprises electric vehicles (10*a*, 10*b*, 10*c*). With this, it becomes possible to make a copy of the key 30 without activating the vehicles 10*a*, 10*b*, 10*c*, as well as preventing theft of the vehicles 10*a*, 10*b*, 10*c*.

In the system, the electronic key (30) comprises an IC card. With this, the foregoing effects can be achieved with the simple structure.

Figure 10:
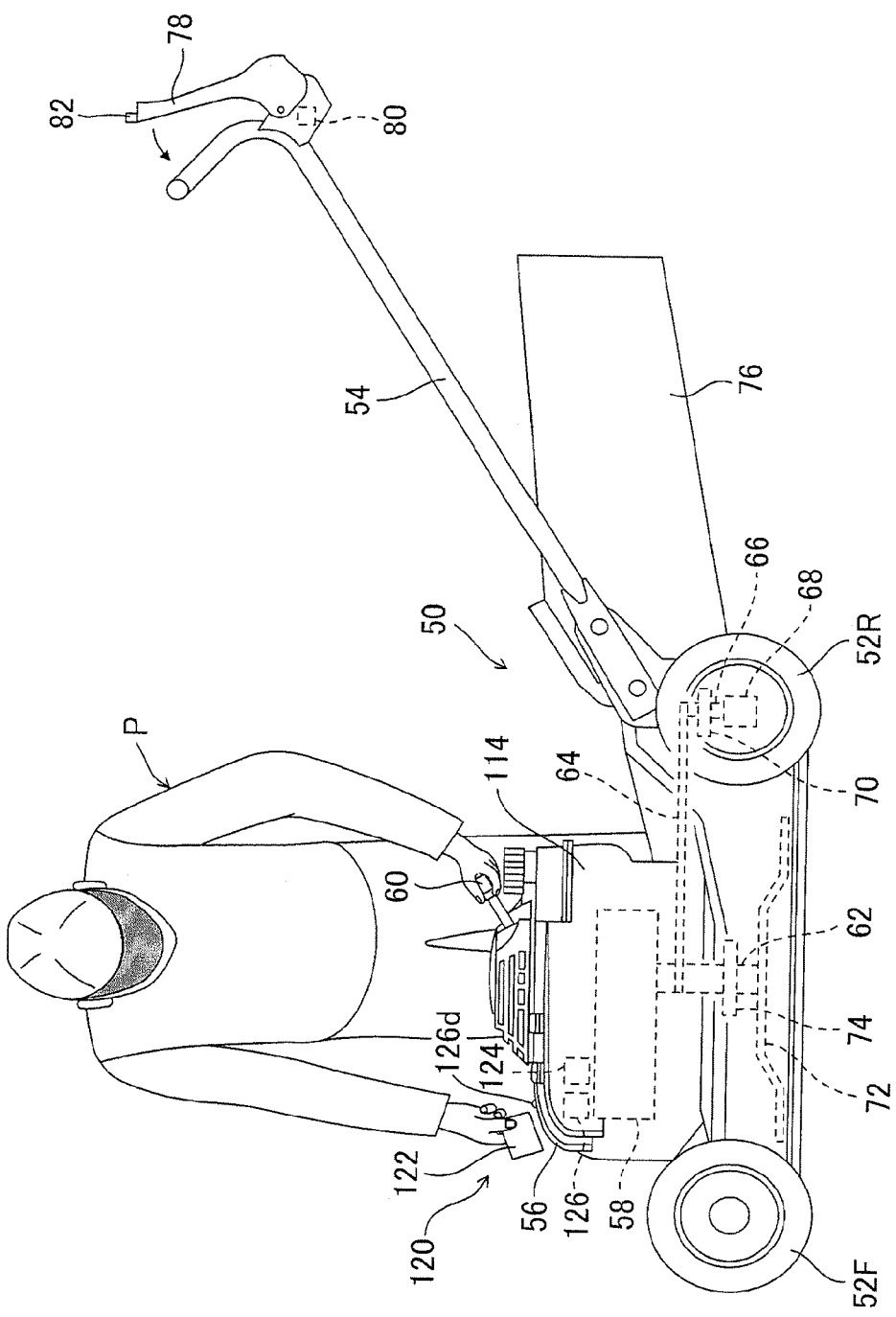
FIG. 10 is a side view of a lawnmower on which a part of an antitheft system according to a second embodiment of this invention is mounted.
Figure 11:
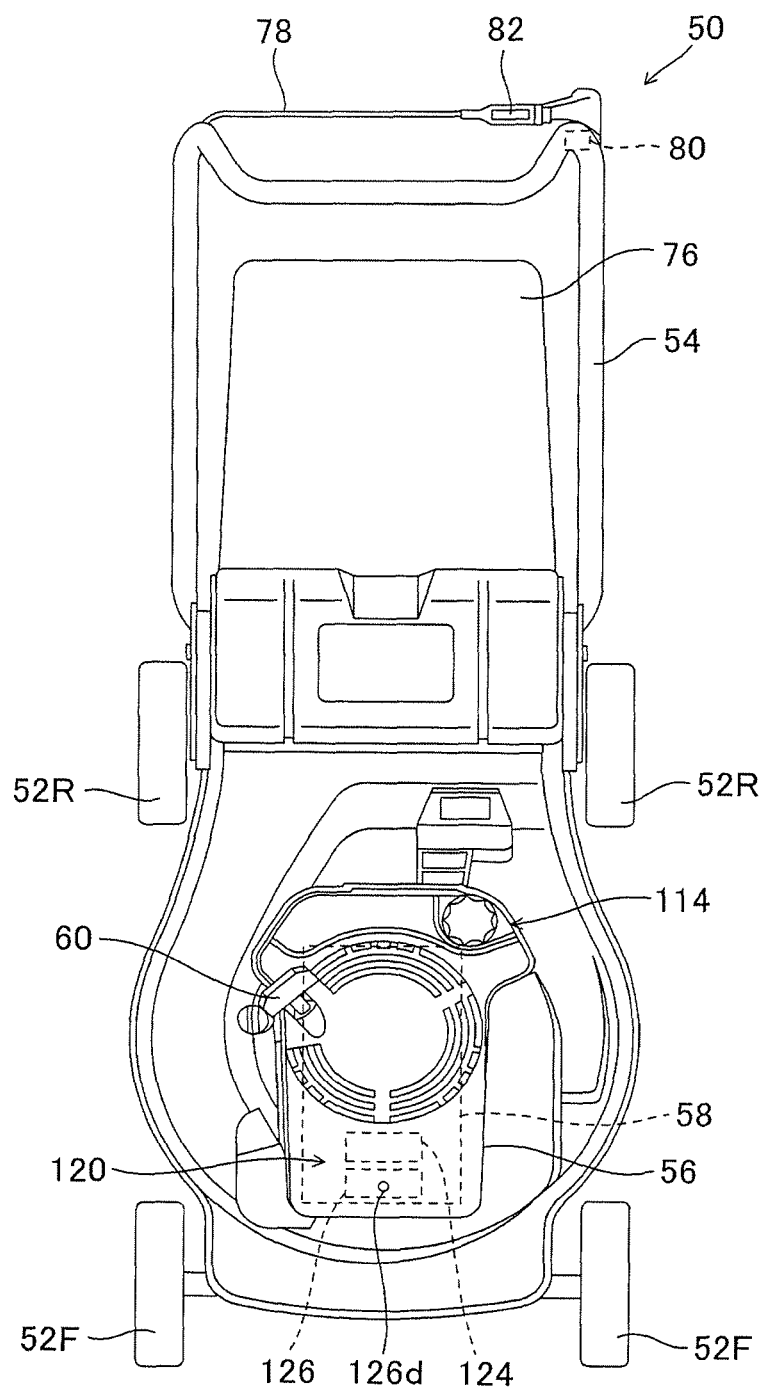
FIG. 11 is a plan view of the lawnmower shown in FIG. 10.

FIG. 10 is a side view of a lawnmower on which a part of an antitheft system according to a second embodiment of this invention is mounted and FIG. 11 is a plan view thereof.

In FIGS. 10 and 11, the reference numeral 50 indicates a lawnmower (operating machine; equipment). The lawnmower 50 is a non-riding self-propelled lawnmower with two front wheels 52F and two rear wheels 52R (a total of four wheels), and a handlebar 54. A general-purpose internal combustion engine (hereinafter called "engine") 58 is installed beneath an engine cover 56 on a frame mounted on the four wheels 52F and 52R. The engine 58 is equipped with a recoil starter 60 installed to be manually operable by the operator P (shown only in FIG. 10).

A crankshaft 62 of the engine 58 is connected to a rear wheel drive axle 66 via a belt 64, as shown in FIG. 10. The drive axle 66 is connected to the rear wheels 52R via a gear mechanism 68. A rear wheel electromagnetic clutch 70 is disposed in the middle of the drive axle 66, and the clutch 70 cuts off the transmission of engine output to the rear wheels 52R.

A grass-cutting blade 72 is mounted on the distal end of the crankshaft 62. A blade electromagnetic clutch 74 is disposed between the blade 72 and the belt 64 in the crankshaft 62, and the clutch 74 cuts off the transmission of engine output to the blade 72. A grass bag 76 is installed in the rear part of the lawnmower 50, so that the grass cut by the blade 72 is collected in the grass bag 76.

A drive lever 78 and a drive switch 80 which produces an ON signal when the drive lever 78 is moved to tilt forward by the operator P in the traveling direction of the lawnmower 50 are installed near the distal end of the handlebar 54. A blade switch 82 is installed on the drive lever 78. The blade switch 82 produces an ON signal when pressed once by the operator P, and terminates producing the ON signal when pressed again.

Figure 12:
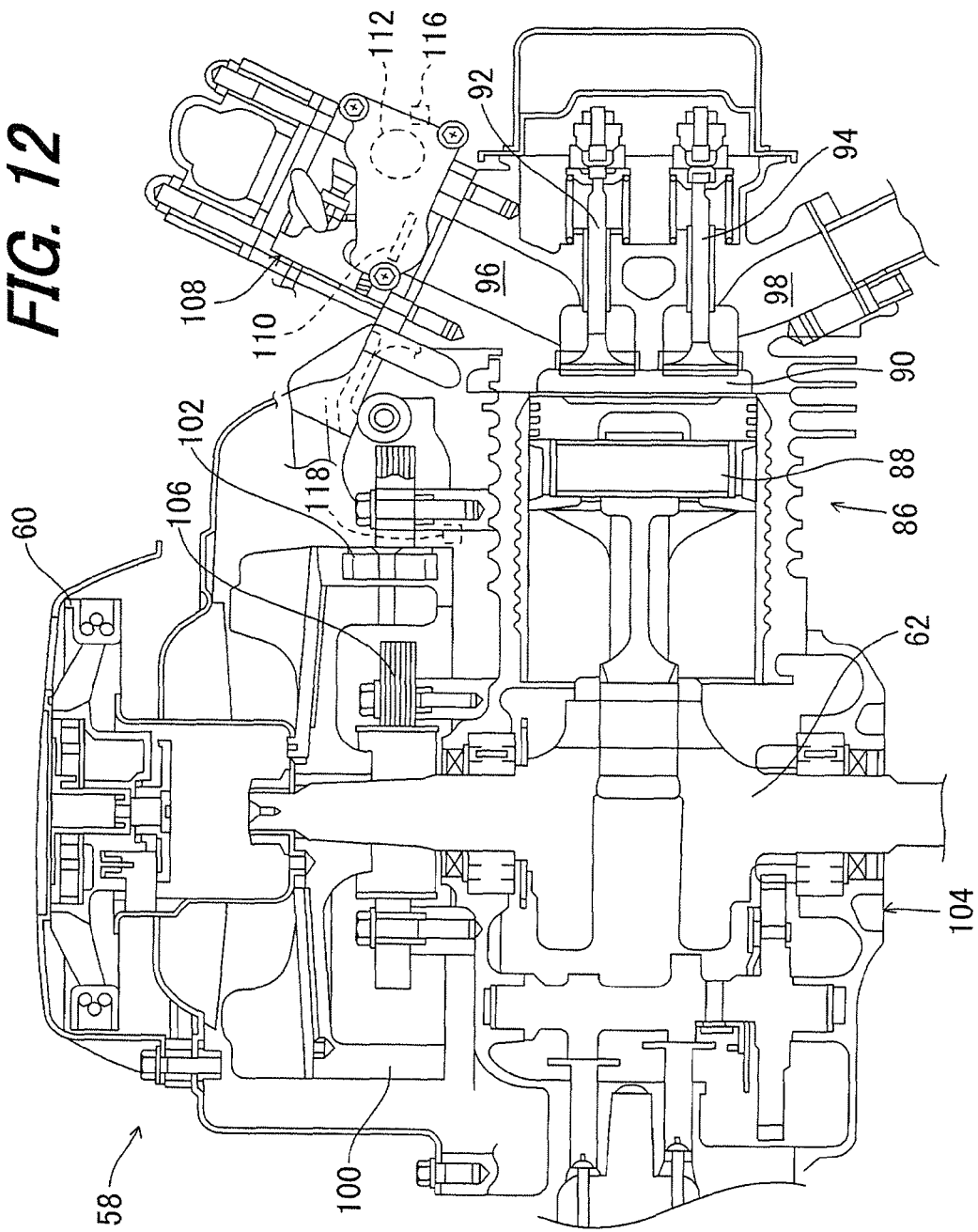
FIG. 12 is an enlarged cross-sectional view of an internal combustion engine shown in FIG. 10.

FIG. 12 is an enlarged cross-sectional view of the engine 58 shown in FIG. 10.

The engine 58 has a cylinder 86, and a piston 88 is accommodated therein to reciprocate. An air intake valve 92 and an exhaust valve 94 are disposed at a position facing a combustion chamber 90 of the engine 58 to open and close the connection between the combustion chamber 90 and an intake passage 96 or exhaust passage 98. The engine 58 specifically comprises an air-cooled, four-cycle, single cylinder OHV engine, and has a displacement of, for example, 163 cc.

The piston 88 is coupled with the crankshaft 62. One end of the crankshaft 62 is attached with a flywheel 100 and the distal end of the flywheel 100 is attached with the recoil starter 60. Although omitted in the drawing, the blade 72 is installed on the other end of the crankshaft 62 via the blade electromagnetic clutch 74.

Multiple permanent magnets 102 are fastened to the inside of the flywheel 100 and a magneto coil (alternator) 106 is mounted on the side of a crankcase 104 so as to face the permanent magnets 102. When the crankshaft 62 is rotated by operation of the recoil starter 60 or reciprocal motion of the piston 88, the magneto coil 106 generates alternating current in synchronous with the rotation.

The alternating current generated by the magneto coil 106 is converted to direct current by a processing circuit (not shown) to be supplied as operating power to a control ECU, authentication ECU (explained later), ignition circuit (not shown) and the like. The engine 58 can be started by the operator P by the recoil starter 60, so it is not equipped with a battery. In other words, it is a battery-less type general purpose internal combustion engine.

A throttle body 108 is installed in the intake passage 96. A throttle valve 110 and an electric motor 112 for driving the throttle valve 110 are accommodated in the throttle body 108. A carburetor assembly (not shown) is provided at a location upstream of the throttle valve 110 and injects gasoline fuel supplied from a fuel tank (indicated by reference numeral 114 in FIGS. 10 and 11). The resulting air-fuel mixture is drawn into the combustion chamber 90 through the throttle valve 110, intake passage 96 and air intake valve 92.

A throttle position sensor 116 is disposed near the motor 112 and produces an output or signal indicative of position (throttle opening) θTH of the throttle valve 110. A crank angle sensor 118 composed of an electromagnetic pickup is installed near the flywheel 100 and produces a pulse signal at every predetermined crank angle.

Figure 13:
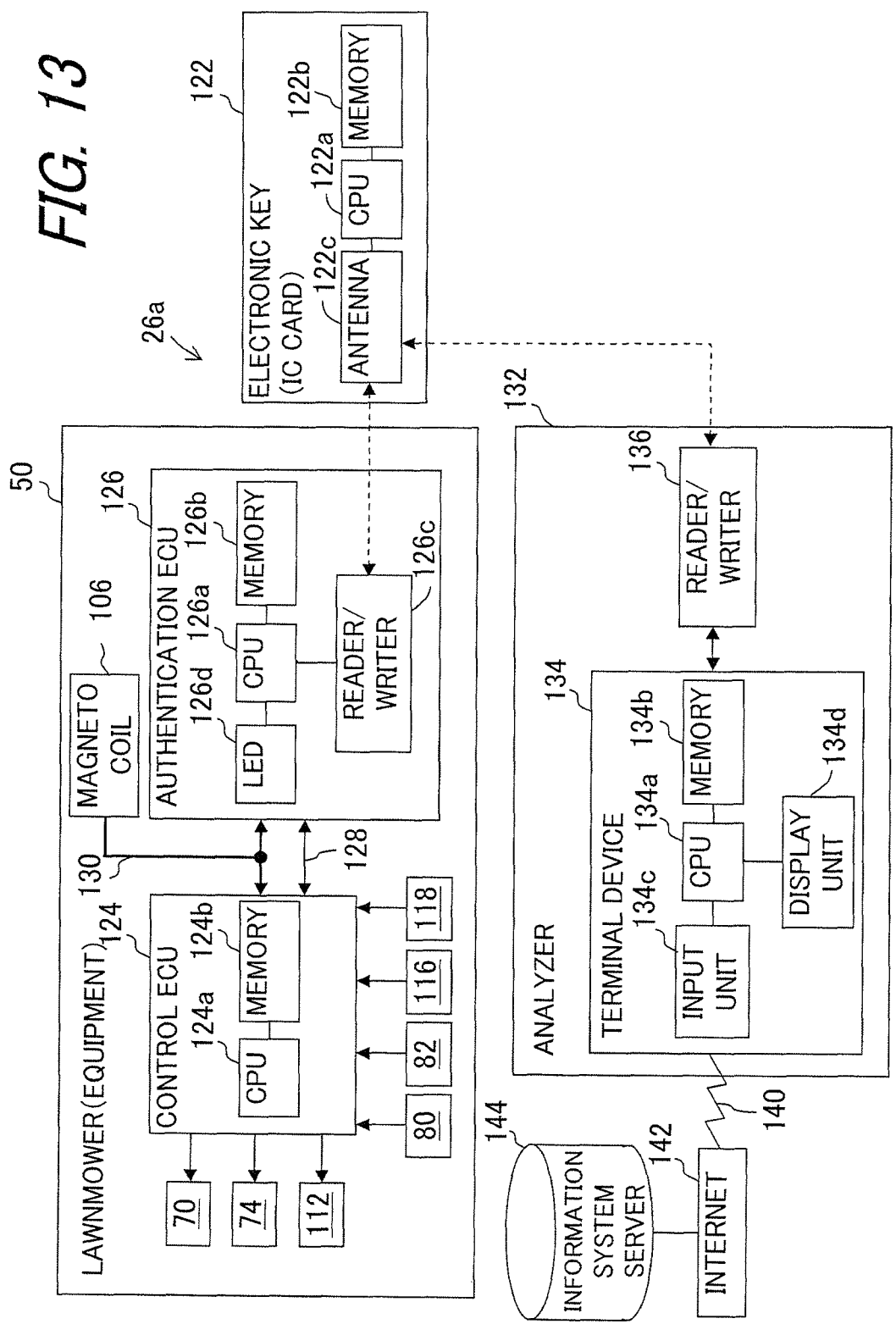
FIG. 13 is a block diagram showing the configuration of the system for the lawnmower shown in FIG. 10.

FIG. 13 is a block diagram showing the configuration of the antitheft system for the lawnmower 50 on which the engine 58 is mounted.

The antitheft system is assigned by the reference numeral 26*a* in FIG. 13. The system 26*a* is equipped with an electronic key 122 that stores, in addition to authenticating data, information on the operating history of the lawnmower 50 (explained later), a control ECU 124 that is installed in the lawnmower 50 and controls the operation of the engine 58 and other components, and an authentication ECU 126 that is installed in the lawnmower 50 for authenticating the key 122. As shown in FIGS. 10 and 11, the ECUs 124, 126 are both disposed at suitable locations in the lawnmower 50, i.e., inside the engine cover 56 near the recoil starter 60.

The control ECU 124 comprises a microcomputer having a CPU 124*a*, memory (EEPROM non-volatile memory) 124*b*, a counter (not shown) and the like. The outputs of the throttle position sensor 116 and crank angle sensor 118 are sent to the control ECU 124, which counts the pulses outputted by the crank angle sensor 118 to calculate (detect) the engine speed NE. Based on the detected engine speed NE and throttle position θTH, the control ECU 124 calculates a current supply command value for operating the motor 112 so as to make the engine speed NE equal to a predetermined desired speed (e.g., 2,000 rpm) and outputs the calculated command value to the motor 112 to control its operation.

The control ECU 124 is further inputted with a drive command (ON signal) from the operator P using the drive switch 80 and with a blade operation command (ON signal) from the operator P using the blade switch 82. Upon receiving the drive command, the control ECU 124 engages the rear wheel magnetic clutch 70 to transmit the rotational output of the engine 58 to the rear wheels 52R, whereby the lawnmower 50 is self-propelled. Upon receiving the blade command, the control ECU 124 engages the blade magnetic clutch 74 to transmit the rotational output of the engine 58 to the blade 72, thereby rotating the blade 72 to enable mowing.

The authentication ECU 126 comprises, similarly to the control ECU 124, a microcomputer having a CPU 126a, a memory (EEPROM) 126b for storing key-checking data and the like, a counter (not shown) and other components. The authentication ECU 126 is further equipped with a reader/writer 126c for reading from the key 122 authenticating data stored therein and writing to the key 122 information indicative of the operating condition of the lawnmower 50 (i.e., information on the operating history and failure of the lawnmower 50 (service data) to be explained later) and with an LED 126d for informing the operator P of the result of electronic key authentication (pass/fail) and the like.

The authentication ECU 126 is connected for communication with the control ECU 124 through a serial communication line 128. The ECUs 124, 126 are connected to the magneto coil 106 through a power line 130 to be supplied with operating power generated by the magneto coil 106.

The key 122 is a contact-less IC card similar to that in the first embodiment equipped with a CPU 122a, a non-volatile memory 122b for storing authenticating data (i.e., identification data (user ID) for identifying the operator P and identification information (product ID) for identifying the model and the like of the lawnmower 50), and an antenna 122c for exchange (input/output) with the reader/writer 126c of authenticating data and the like by short-distance wireless communication.

The IC card constituting the key 122 is also made of resin and houses the CPU 122a and other components in its interior. As shown in FIG. 10, the card is made portable to be carried by the operator P. In the second embodiment, the key 122 may be the first key (master key) or may be the second key (duplicate key).

Since the authentication operation, among the operations of communication activity between the key 122 and the reader/writer 126c of the authentication ECU 126, is the same as the first embodiment, the explanation thereof is omitted.

When performing the authentication of the key 122, the authentication ECU 126 copies (writes) information on the operating history and the like in the memory 122b of the key 122 using the reader/writer 126c. This will be explained later.

As shown in FIG. 13, the system 26a having the authentication ECU 126, etc., is further equipped with an analyzer 132 for reading and analyzing information stored in the key 122. The analyzer 132 is installed at, independently of the lawnmower 50, such as a repair shop associated with a lawnmower sales outlet (not shown).

The analyzer 132 is equipped with a terminal device 134 used to analyze the operating history and other information on the lawnmower 50, and a reader/writer 136 connected to the device 134. The device 134 is a personal computer having a CPU 134a, a memory 134b, an input unit 134c comprising a keyboard, mouse and the like (none of which is shown) operable by the operator P, and a display unit 134d comprising a display (screen). Although not shown, the device 134 is connected to a power source (e.g., a commercial power source) that supplies operating power.

The reader/writer 136 operates similarly to the reader/writer 126c of the authentication ECU 126. Specifically, when the key 122 is moved thereto, the reader/writer 136 outputs radio wave to the key 122, thereby supplying the key 122 with operating power, and reads the authenticating data, operating history and other information stored in the key 122.

The device 134 is configured to be able to access an information system server 144 through a communication circuit 140 and the Internet (Web; public communication network) 142. The server 144 stores parts data including the specifications, price, inventory and the like of the components (e.g., the engine 58 and authentication ECU 126) constituting the lawnmower 50. In other words, the server 144 stores specifications, inventory and other parts data required for ordering a part of the lawnmower 50 when that part fails.

The analyzer 132 can copy the key 122 using the devise 134 and reader/writer 136. The copying operation is performed in the same manner as that by the electronic key copying unit 42 in the first embodiment, so the explanation thereof is omitted. Thus, the analyzer 132 also functions as an electronic key copying unit.

The operation of the system 26a for the lawnmower (equipment) 50 thus configured is explained in the following.

Figure 14:
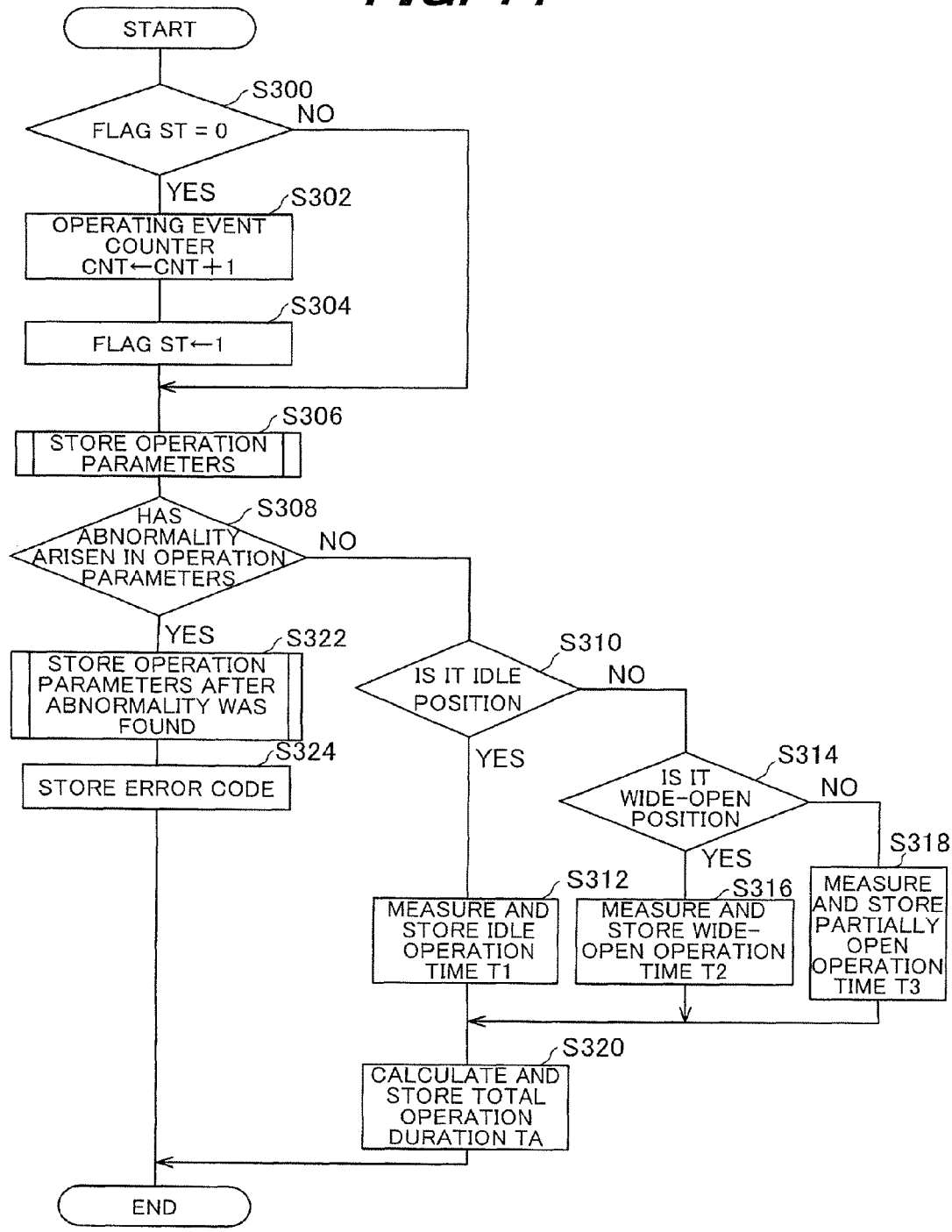
FIG. 14 is a flowchart showing the operation of the system shown in FIG. 10, specifically the sequence of operations of the authentication ECU thereof.

FIG. 14 is a flowchart showing the operation of the system 26a, specifically the sequence of operations of the authentication ECU 126 thereof. The illustrated program is executed at predetermined intervals (e.g., every 100 milliseconds).

The program begins at S300, in which it is determined whether the bit of a flag ST is set to 0. The bit of the flag ST is set in a later processing step. The bit thereof (initial value 0) being set (reset) to 0 indicates that the current program loop is the first program loop following starting of the engine 58, and its being set to 1 indicates that the current program loop is the second or a later program loop.

In the first program loop, the result in S300 is affirmative and the program proceeds to S302, in which the value of an operating event counter CNT indicative of the number of times the lawnmower 50 has been operated is incremented by 1, and to S304, in which the bit of the flag ST is set to 1. Therefore, in the next program loop the result in S300 is negative and S302 and S304 are skipped.

The program next proceeds to S306, in which the operation parameters of the lawnmower 50 to be inputted to and outputted from the control ECU 124 are stored (saved) in the memory 126b. These parameters include the throttle position θTH detected based on the output of the throttle position sensor 116, the engine speed NE detected based on the output of the crank angle sensor 118, the current supply command value for the motor 112, the drive command (ON signal) from the drive switch 80, and the blade operation command (ON signal) from the blade switch 82.

Figure 15:
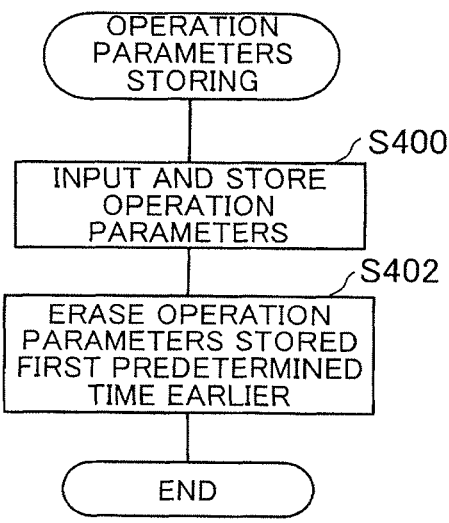
FIG. 15 is a subroutine flowchart showing the operation for storing operation parameters of FIG. 14.

FIG. 15 is a subroutine flowchart showing the sequence of operations for storing operation parameters of FIG. 14.

The program begins at S400, in which the present (latest) operation parameters of the lawnmower 50 are sent from the control ECU 124 through the serial communication line 128 to be inputted to and stored in the memory 126b.

The program then proceeds to S402, in which operation parameters stored a first predetermined time earlier (e.g., 1 minute earlier) are erased from the memory 126b. When no first-predetermined-time-earlier operation parameters are stored in the memory 126b, i.e., when the first predetermined time has not yet passed after starting of the engine 58, S402 is skipped (not executed).

By this process, the operation parameters are collected in (inputted to) the memory 126b periodically (i.e., every 100 milliseconds) for storage of time-series data (i.e., time-series data over a predetermined period (1 minute)).

Returning to the explanation of FIG. 14, the program next proceeds to S308, in which it is determined whether any abnormality has arisen in the stored operation parameters, specifically whether any abnormality has arisen in the operation parameters because of failure of a component (e.g., the engine 58) of the lawnmower 50. The processing of S308 is conducted by comparing the operation parameters with threshold values set for the operation parameters. The threshold values are defined as values that enable determination of failure of components of the lawnmower 50.

Therefore, when the processing of S308 finds that an operation parameter exceeds the range of its threshold value, it is discriminated that the operation parameter is abnormal (i.e., the lawnmower 50 fails). When the operation parameters are found to be within their threshold ranges, it is discriminated that the operation parameters are normal (i.e., the lawnmower 50 is failure-free).

When the result in S308 is negative, the program proceeds to S310, in which it is determined whether, among the stored operation parameters, the throttle position θTH is a predetermined idle position which is set near the fully closed position. When the result in S310 is affirmative, the program proceeds to S312, in which an idle operation timer is started to measure the cumulative (total) time that the engine 58 operates at the idle throttle position (the idle operation time T1) and the measured value is stored in the memory 126b, in other words, the idle operation time T1 is measured and stored in the memory 126b.

When the result in S310 is negative, the program proceeds to S314, in which it is determined whether the throttle position θTH is a predetermined wide-open position which is set near the fully opened position. When the result in S314 is affirmative, the program proceeds to S316, in which a wide-open operation timer is started to measure the cumulative time that the engine 58 is kept operating at the wide-open throttle position (the wide-open operation time T2) and the measured value is stored in the memory 126b.

When the result in S314 is negative, i.e. when the throttle position θTH is neither the idle position nor the wide-open position and the throttle valve 110 is partially open, the program proceeds to S318, in which a partially open operation timer is started to measure the cumulative time that the engine 58 operates at a partially open throttle position (the partially open operation time T3) and the measured value is stored in the memory 126b. When one among the idle operation timer, wide-open operation timer and partially open operation timer has been started as explained in the foregoing, the measurement performed thereby is terminated at the time another of the timers is started. As a result, only one of the three timers is always in operation while the engine 58 is running.

After the processing of S312, S316 or S318, the program proceeds to S320, in which the total operation duration TA corresponding to the total use (operating) time of the lawnmower 50 is calculated and stored in the memory 126b. Specifically, the sum of the idle operation time T1, wide-open operation time T2 and partially open operation time T3 is calculated and stored as the total operation duration TA, whereafter the program is terminated.

On the other hand, when the result in S308 is affirmative, the program proceeds to S322, in which operation parameters after operation parameter abnormality was found are stored in the memory 126b as "abnormal-state operation parameters."

Figure 16:
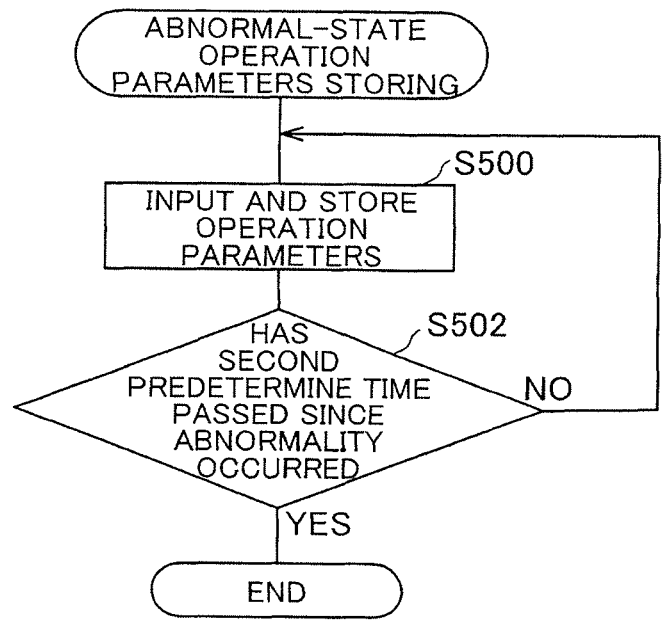
FIG. 16 is a subroutine flowchart showing the operation for storing abnormal-state operation parameters of FIG. 14.

FIG. 16 is a subroutine flowchart showing the sequence of operations for storing the abnormal-state operation parameters in S322 of FIG. 14.

The program begins in S500, in which the operation parameters of the lawnmower 50 are sent from the control ECU 124 through the serial communication line 128 to be inputted to and stored in the memory 126b.

The program next proceeds to S502, in which it is determined whether a second predetermined time (e.g., 1 minute) has passed since the operation parameter abnormality occurred. This determination is made in another subroutine (not shown) by starting a counter (up-counter) when the operation parameter abnormality occurs and ascertaining whether its count value has reached the second predetermined time.

When the result in S502 is negative, the processing of S500 is repeated. When it is affirmative, the subroutine is terminated. In other words, the operation parameters after occurrence of abnormality are collected (inputted) and time-series data (i.e., time-series data over the second predetermined time (1 minute)) are stored as abnormal-state operation parameter (frozen data).

Returning to the explanation of FIG. 14, the program next proceeds to S324, in which the type of abnormality (failure) of the lawnmower 50 is estimated based on the abnormal-state operation parameters, and an error code indicating the estimated abnormality (failure) type is stored in the memory 126b.

Thus, information on the operating history (operation parameters, idle operation time T1, wide-open operation time T2, partially open operation time T3 and total operation duration TA) and information on failure (abnormal-state operation parameters and error codes) of the lawnmower 50 are stored in the memory 126b. Among the different kinds of lawnmower 50 operating history information, the operation parameters of the most recent several cycles (e.g., the most recent 5 cycles) are maintained in the memory 126b.

Figure 17:
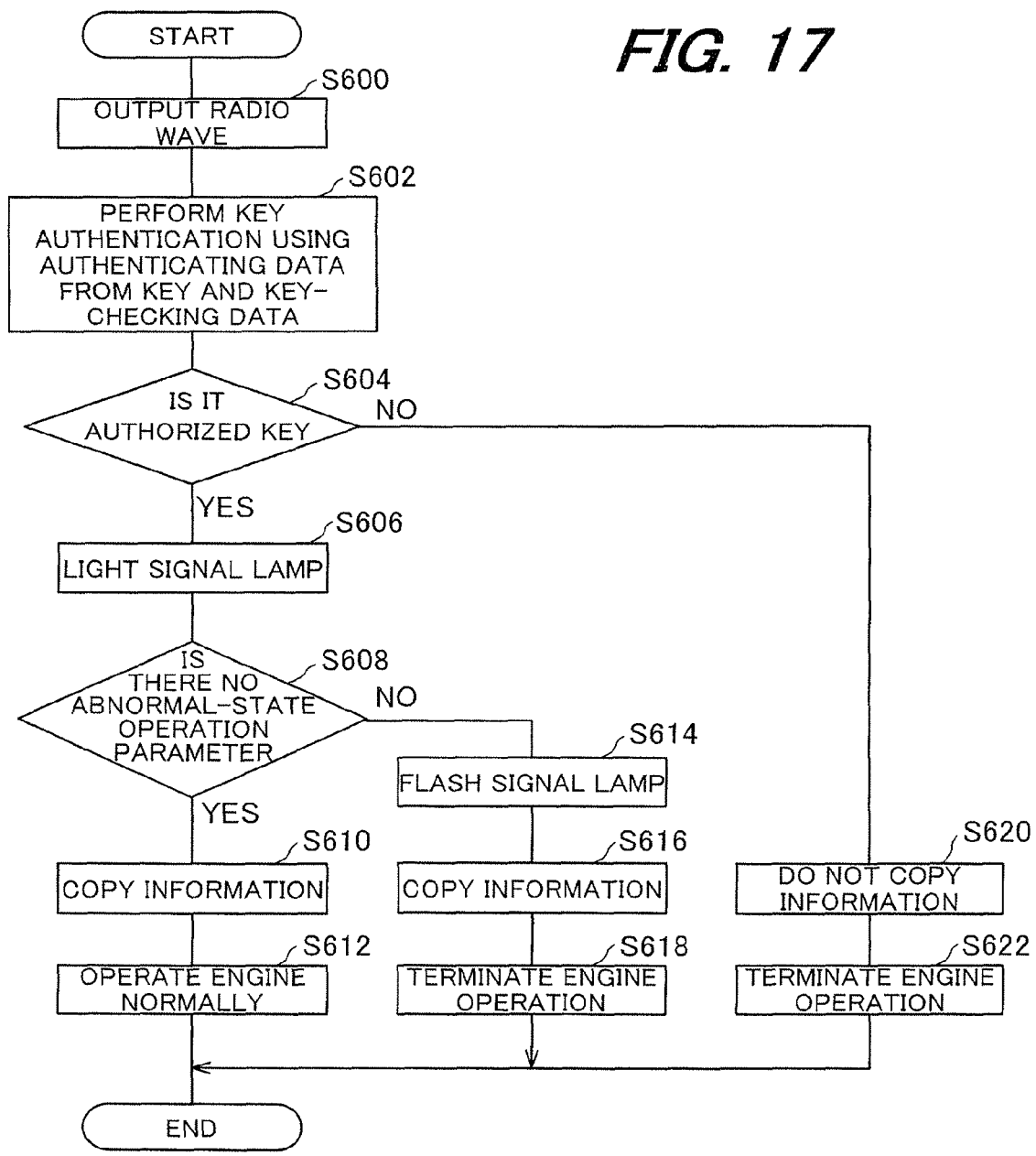
FIG. 17 is a flowchart similar to FIG. 14, but showing the operation of the system, specifically the sequence of operations of the authentication ECU thereof.

FIG. 17 is a flowchart also showing the operation of the system 26a, specifically the sequence of operations of the authentication ECU 126. The program shown in FIG. 17 is executed in parallel with the processing of FIG. 14 and is executed only once at the time the engine 58 is started.

When the operator P operates the recoil starter 60, more exactly when, as shown in FIG. 10, the operator P operates the recoil starter 60 (pulls the recoil starter handle) while holding the key 122 near the reader/writer 126c of the authentication ECU 126, the engine 58 is started, the magneto coil 106 commences power generation, and the ECU 126 is supplied with operating power.

After the ECU 126 has been supplied with operating power and activated, the program begins in S600, in which radio wave is outputted from the reader/writer 126c to the key 122, thereby supplying the key 122 with operating power, and proceeds to S602, in which authentication of the key 122 is performed using authenticating data outputted from the key 122 and key-checking data.

The program next proceeds to S604, in which it is determined whether in S602 the key 122 held near the reader/writer 126c was found to be an authorized key for the lawnmower 50. When the result is affirmative, the program proceeds to S606, in which the signal lamp 126d is lit to inform the operator P that the key 122 was authenticated to be the authorized key.

The program then proceeds to S608, in which it is determined whether the information on operating history and failure stored in the memory 126b is free of abnormal-state operation parameters. When the result in S608 is affirmative, the program proceeds to S610, in which the operating history information stored in the memory 126b is reproduced in (copied to) the key 122. Specifically, the information (data) is outputted from the reader/writer 126c and written to the memory 122b of the key 122. The program then proceeds to S612, in which the engine 58 is operated normally, whereafter the program is terminated.

On the other hand, when the result in S608 is negative, the program proceeds to S614, in which the signal lamp 126d is flashed to inform the operator P that an abnormal-state operation parameter was stored in the memory 126b during the preceding operation of the lawnmower 50. This amounts to advising the operator P that the lawnmower 50 should be inspected (repaired) because it experienced a failure. Thus, the signal lamp 126d functions to notify the operator P of any failure occurring in the lawnmower 50.

The program next proceeds to S616, in which the operating history information and failure information stored in the memory 126b are copied to the key 122, and to S618, in which the operation of the engine 58 is terminated by, for example, ignition cut-off. In other words, when a failure occurs, operation of the lawnmower 50 is not allowed.

On the other hand, when the result in S604 is negative, the program proceeds to S620, in which copying of the operating history and other information to the key 122 is not performed. Thus it is configured such that information is copied to the key 122 if it is authenticated to be the authorized key (S610, S616) but the information is not copied if the key 122 is not authenticated (S620). Following the processing of S620, the program proceeds to S622, in which the operation of the engine 58 is terminated by ignition cut-off or some other means, thereby preventing theft of the lawnmower 50.

In this embodiment, the operation of the engine 58 is terminated in S622 when the key 122 is not the authorized key. However, instead of stopping the engine 58, it is possible, for example, to control the upper limit of the engine speed NE of the engine 58, specifically to restrict the upper limit of the engine speed NE to slightly higher than the idling speed (but lower than the lowest speed at which mowing is possible). By preventing rotation of the blade 72 of the lawnmower 50, this arrangement makes lawn mowing impossible but allows the lawnmower 50 to be driven at low speed, thus providing a way to deal with cases where the operator P lost the key 122.

The operation of the analyzer 132, which is one of the operations of the system 26a, is explained next. When flashing of the signal lamp 126d as a result of the aforesaid processing makes the operator P aware that the lawnmower 50 has a problem, or at the time of a regular maintenance inspection, the operator P sends the key 122 to a shop equipped with the analyzer 132 (a shop where a technician able to service and repair the lawnmower 50 is available).

Figures 18, 19:
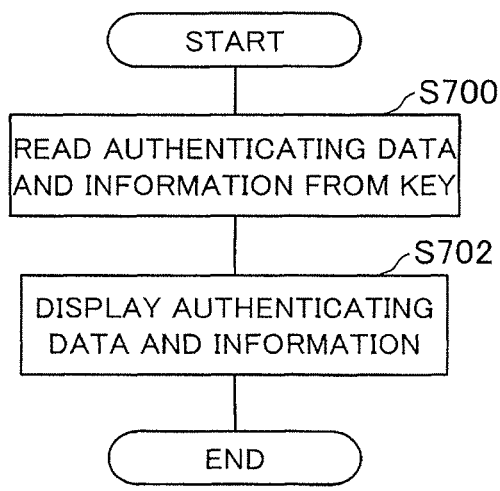
FIG. 18 is a flowchart showing the operation of an analyzer shown in FIG. 13, specifically the sequence of operations of a terminal device thereof.
FIG. 19 is an explanatory view showing operating history and other information displayed on a display unit of the terminal device shown in FIG. 13.

FIG. 18 is a flowchart showing the sequence of operations of the analyzer 132. The illustrated routine is performed in the terminal device 134 of the analyzer 132 when the key 122 is held near the reader/writer 136.

When the key 122 is held near the reader/writer 136 to be supplied with radio wave-induced operating power, it outputs authenticating data, operating history and other information. The program begins in S700, in which the authenticating data, operating history and other information are read by the reader/writer 136. The program next proceeds to S702, in which the read authenticating data, etc., are displayed on the display unit 134d.

FIG. 19 shows the operating history and other information displayed on the display unit 134d.

As shown in FIG. 19, the display unit 134d displays information on the operating history, specifically the user ID, product ID, together with service data such as the total operation duration TA, idle operation time T1, wide-open operation time T2, partially open operation time T3, number of operating times (operating event counter CNT), operation parameters, error code(s) (when the lawnmower 50 has experienced a failure or the like), and abnormal-state operation parameters.

When the information on the operating history has been displayed on the display unit 134d, based thereon the service technician determines (troubleshoots) the cause of the lawnmower 50 failure. Based on the determined failure cause, the service technician takes remedial action by accessing the server 144 via the input unit 134c of the terminal device 134, the communication circuit 140 and the Internet 142, specifically by placing an order for a part to replace the one that failed, with reference to the part data contained in the server 144.

Use of the key 122 is not limited to cases where the lawnmower 50 breaks down as discussed above. The operator P can send the key 122 to the maintenance shop when a periodic inspection is due, so that the service technician can use information obtained from the key 122 to estimate wear and tear on the components (engine 58 etc.) of the lawnmower 50, thereby making it possible to perform optimum maintenance procedures.

It should be noted that, in the foregoing, although the number of the lawnmower 50 is one, it can be two or more, and in this case, the key 122 stores authenticating data corresponding to each of the multiple lawnmowers 50 and operating history and failure information of the lawnmowers 50.

As stated above, the second embodiment is configured to have a system (26a) for preventing an equipment (50) from theft, comprising: an electronic key (122) that is adapted to be carried by an operator of the equipment and stores authenticating data for identifying the operator who carries the electronic key; an authenticator (126, S602, S604) that is installed at the equipment and performs authentication check as to whether the electronic key is an authorized key using stored key-checking data, when the authenticating data is outputted from the electronic key; and an electronic key copier (132) that is provided separately from the equipment and copies the electronic key.

In the system, the electronic key (122) comprises at least one of a first electronic key (301) and a second electronic key (302) copied from the first electronic key by the electronic key copier, and the electronic key copier inhibits additional copying of the second electronic key.

In the system, the equipment comprises an operating machine (50), and the electronic key stores authenticating data in a same number as that of the equipment.

And, the system further includes: a memory (126b) that is installed at the equipment and stores information on at least one of operating history operating history (operation parameters, idle operation time T1, wide-open operation time T2, partially open operation time T3 and total operation duration TA) and information on failure (abnormal-state operation parameters and error codes) of the equipment; and the authenticator copies the information to the electronic key (122), when performing the authentication check (S610, S616).

With this, the operating history and failure information can be easily and reliably read even when the lawnmower 50 experiences a breakdown or the like, thus offering improved convenience while also making it possible to prevent theft of the lawnmower 50.

Specifically, the operating history and other information are copied and stored in both the memory 126b of the lawnmower 50 and the memory 122b of the key 122. As a result, the information can be easily read from the key 122 when the lawnmower 50 experiences a breakdown or the like, simply by sending the key 122 to the repair shop (i.e., without need to haul the lawnmower 50 itself to the repair shop). Since the service technician who repairs the lawnmower 50 can therefore pinpoint the cause of the breakdown from the read information, the breakdown can be promptly dealt with (namely, the lead-time between ordering and delivery of replacement parts can be shortened), which also enhances convenience.

In the system, the authenticator copies the information to the electronic key (122), when performing the authentication check. This arrangement ensures that the information can be reliably read from the key 122 if the lawnmower memory 126b should fail. This eliminates the inconvenience of not being able to determine the failure cause because information cannot be read due to the breakdown.

In the system, the authenticator (126) copies the information to the electronic key when the electronic key (122) is authenticated to be an authorized key (S604, S610, S616), whereas the authenticator does not copy the information to the electronic key when the electronic key (122) is not authenticated to be an authorized key (S604, S620). This arrangement ensures that the operating history and other information are reliably copied to the authorized key 122 and that copying of information to an electronic key other than the authorized key (an unauthorized key) is prevented.

The system further includes: an informer (126d, S608, S614) that informs the failure of the equipment to the operator when the information on the failure of the equipment (50) is copied to the electronic key (122). With this, it becomes possible to let the operator P recognize that a failure has occurred in the equipment 50.

The system further includes: an analyzer (132) that is provided separately from the equipment (50) and reads the information copied in the electronic key (122) to analyze. With this, the service technician can easily read the information through the analyzer 132 at a place apart from the equipment 50.

In the system 26a, the equipment comprises a lawnmower (50). With this, the operating history and failure information of the lawnmower 50 can be easily and reliably read from the key 122, thus offering improved convenience while also making it possible to prevent theft of the lawnmower 50.

The remaining configuration is the same as that in the first embodiment.

Although the first embodiment is explained taking a moving object, i.e., the small electric vehicle 10 as an example of the equipment having the system 26, it can be other kinds of equipment including moving objects such as four-wheeled vehicles, two-wheeled vehicles, etc., and machines such as lawnmowers, cultivators, generators, snow removal machines and materials handling machines.

Although the vehicle 10 is exemplified as the equipment and it is configured to supply the motor 22 (which is a power source of the wheels 12), authentication ECU 34, etc., with operating power from the battery 24, in the case where the equipment is a machine (e.g., a lawnmower or a cultivator) having the engine as a power source, a magneto coil, recoil starter and the like can be provided instead of the battery to supply power from the magneto coil to the authentication ECU 34 and other components (i.e., it can be battery-less).

Although the second embodiment is explained taking a machine, i.e., the lawnmower 50 as an example of the equipment having the system 26a, it can be other kinds of equipment including machines such as cultivators, generators, snow removal machines and materials handling machines, and moving vehicles such as four-wheeled vehicles, two-wheeled vehicles and small electric vehicles.

The second embodiment is aimed to have an antitheft system which, based on the configuration of the first embodiment, enables to copy the information on the operating history and on failure of the equipment. For that reason, although only single number of the lawnmower is disclosed in the second embodiment, two or more lawnmower can be used in the second embodiment.

Although the lawnmower 50 is configured to supply the authentication ECU 126, etc., with operating power not from a battery but from the magneto coil 106 (to have a battery-less configuration), it is alternatively possible to replace the magneto coil 106 with a battery and supply the authentication ECU 126, etc., with power from the battery.

Although the key 122 is constituted as an IC card, it is possible instead, for example, to incorporate a function similar to that of the key 122 in a mobile phone so that the mobile phone can send information directly to the terminal device 134 at the repair shop by electronic mail or the like via the Internet 142. This configuration enhances convenience by enabling quick transmission of lawnmower 50 operating history, etc., to the terminal device 134.

Although the piston displacement of the engine 58 was specified, the specified value is non-limiting example.

In the first and second embodiments, although the key 30, 122 and the reader/writer 34c, 126c of the authentication ECU 34, 126 (and the reader/writer 46, 136) are configured to exchange data using short-distance RFID wireless communication, it is alternatively possible to exchange data via another type of wireless communication means or wired communication means.

Japanese Patent Application Nos. 2008-180557 and 2008-180558, both filed on Jul. 10, 2008, are incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for preventing a plurality of equipment from theft, comprising:

an electronic key that is configured to be carried by an operator of the equipment and stores plurality of authenticating data, each corresponding to the plurality of equipment;

an authenticator that is installed at the equipment and performs authentication check as to whether the electronic key is an authorized key using stored key-checking data, when the authenticating data is outputted from the electronic key; and an electronic key copier that is provided separately from the equipment and is configured to copy the electronic key, wherein the electronic key is one of a first electronic key comprising a master ID which can be copied by the electronic key copier and a second electronic key copied from the first electronic key;

the electronic key copier including a terminal device and a reader/writer connected to the terminal device, wherein the terminal device is configured to read the master ID from the first electronic key and store as a copy ID, to write the copy ID into the second electronic key so that the second electronic key is copied from the first electronic key, and the terminal device is further configured to write the stored copy ID into the first electronic key, while the terminal device is configured to inhibit additional copying of the second electronic key.

2. The system according to claim 1, wherein the equipment comprises a moving object or an operating machine, and the electronic key stores authenticating data in a same number as that of the equipment.

3. The system according to claim 1, further including:
a memory that is installed at the equipment and stores information on at least one of operating history and failure of the equipment;
and the authenticator copies the information to the electronic key, when performing the authentication check.

4. The system according to claim 3, further including:
an informer that informs the failure of the equipment to the operator when the information on the failure of the equipment is copied to the electronic key.

5. The system according to claim 3, further including:
an analyzer that is provided separately from the equipment and reads the information copied in the electronic key to analyze.

6. The system according to claim 1, wherein the equipment comprises an electric vehicle.

7. The system according to claim 1, wherein the equipment comprises a lawnmower.

8. The system according to claim 1, wherein the electronic key comprises an IC card.

9. The system according to claim 1, wherein the terminal device is further configured to check whether the key moved to the reader/writer is to be copied.

10. The system according to claim 1, wherein the terminal device is further configured to inform that the second electronic key is complete and terminate the operation of copying the electronic key.

11. The system according to claim 1, wherein the terminal device is further configured to inform that a copy of the electronic key cannot be made and to end the operation of copying the electronic key if the electronic key is determined to be the second electronic key, where in copying of the second electronic key is inhibited.

* * * * *